US012116226B2

(12) United States Patent
Koch et al.

(10) Patent No.: US 12,116,226 B2
(45) Date of Patent: Oct. 15, 2024

(54) PRINTING PRESS COMPRISING A NON-IMPACT PRINTING DEVICE

(71) Applicant: KOENIG & BAUER AG, Würzburg (DE)

(72) Inventors: Heinz Michael Koch, Dresden-Cossebaude (DE); Benjamin Gohl, Dresden (DE); Volker Kessler, Dresden (DE)

(73) Assignee: KOENIG & BAUER AG, Würzburg (DE)

(*) Notice: Subject to any disclaimer, the term of this patent is extended or adjusted under 35 U.S.C. 154(b) by 0 days.

(21) Appl. No.: 18/561,359

(22) PCT Filed: Jun. 21, 2022

(86) PCT No.: PCT/EP2022/066842

§ 371 (c)(1),
(2) Date: Nov. 16, 2023

(87) PCT Pub. No.: WO2023/285080

PCT Pub. Date: Jan. 19, 2023

(65) Prior Publication Data

US 2024/0246786 A1 Jul. 25, 2024

(30) Foreign Application Priority Data

Jul. 16, 2021 (DE) ..................... 10 2021 118 468.1

(51) Int. Cl.
*B65H 5/22* (2006.01)
*B41F 3/06* (2006.01)
(Continued)

(52) U.S. Cl.
CPC ......... *B65H 11/005* (2013.01); *B41J 11/0085* (2013.01); *B41J 13/0009* (2013.01);
(Continued)

(58) Field of Classification Search
None
See application file for complete search history.

(56) References Cited

U.S. PATENT DOCUMENTS 9,573,780 B2 2/2017 La Vos et al.
2004/0178567 A1* 9/2004 Edinger .................. B65H 5/24 271/226
(Continued)

FOREIGN PATENT DOCUMENTS

DE 102016207397 A1 6/2016
DE 102017212984 A1 1/2019
JP 3223938 U * 11/2019 ............ B65G 39/18

OTHER PUBLICATIONS

Translation of JP 3223938 U, publication date Nov. 14, 2019. (Year: 2019).*
(Continued)

*Primary Examiner* — Leslie J Evanisko
(74) *Attorney, Agent, or Firm* — MATTINGLY & MALUR, PC

(57) ABSTRACT

In some examples, a printing press includes a non-impact printing device, and further includes a plurality of processing stations that each process sheets. In the printing press, at least one lifting nozzle is arranged in a profile element of a guide device. The lifting nozzle is configured to open in a direction of a tip of a tapered profile element. A suction belt feed table includes a catching device having a catching position, which is assumed as a result of an actuation, for adjacent individual sheets that follow one another. The catching device, in its catching position, catches sheets on the suction belt feed table that are fed from a first transport device, which is arranged upstream from the suction belt feed table, to the suction belt feed table, before the sheets are
(Continued)

transferred to a transport device arranged downstream from the suction belt feed table and stacked there.

16 Claims, 21 Drawing Sheets

(51) Int. Cl.

| | |
|---|---|
| ***B41J 11/00*** | (2006.01) |
| ***B41J 13/00*** | (2006.01) |
| ***B41J 13/08*** | (2006.01) |
| ***B41J 13/10*** | (2006.01) |
| ***B65H 5/38*** | (2006.01) |
| ***B65H 11/00*** | (2006.01) |

(52) U.S. Cl.
CPC ............. *B41J 13/009* (2013.01); *B41J 13/08* (2013.01); *B41J 13/10* (2013.01); *B65H 5/38* (2013.01); *B65H 2404/61* (2013.01); *B65H 2406/122* (2013.01); *B65H 2801/21* (2013.01)

(56) References Cited

U.S. PATENT DOCUMENTS

| | | | |
|---|---|---|---|
| 2005/0156377 | A1 | 7/2005 | Jacobs |
| 2009/0190981 | A1 | 7/2009 | Tanaka |
| 2016/0152045 | A1 | 6/2016 | La Vos et al. |
| 2018/0072076 | A1 | 3/2018 | Moehringer et al. |
| 2020/0017310 | A1 | 1/2020 | Moehringer |

OTHER PUBLICATIONS

International Search Report PCT/EP2022/066842 dated Oct. 21, 2022.

* cited by examiner

PRINTING PRESS COMPRISING A NON-IMPACT PRINTING DEVICE

CROSS-REFERENCES TO RELATED APPLICATIONS

This application is the US national phase, under 35 USC § 371, of PCT/EP2022/066842, filed on Jun. 21, 2022, published as WO 2023/285080 A1 on Jan. 19, 2023, and claiming priority to DE 10 2021 118 468.1, filed Jul. 16, 2021, and all of which are expressly incorporated by reference herein in their entireties.

TECHNICAL FIELD

Examples herein relate to a printing press comprising a non-impact printing device, the printing press further including a plurality of processing stations that each process sheets. The processing stations are arranged one behind the other in a transport direction of the sheets. One of the processing stations includes the non-impact printing device. A relevant processing station the non-impact printing device, or another of the processing stations, includes a first transport device that transports the sheets along a linear transport section and that comprises at least one continuously revolving conveyor belt that is diverted at a rotating diverting roller. This first transport device is configured so as to transport adjacent individual sheets that directly follow one another in a sequence lying flat in each case on its at least one conveyor belt. A second transport device transports the sheets lying flat along a linear transport section, likewise on at least one continuously revolving conveyor belt that is arranged downstream from the processing station that includes the first transport device. A discontinuity point in the mechanical support of the sheets to be transferred in each case is formed at the point at which the sheets to be transported are transferred from the relevant conveyor belt of the first transport device to the relevant conveyor belt of the second transport device following in the transport direction of the sheets, in a conveying plane of the sheets to be transported. The diverting roller diverts the at least one conveyor belt of the first transport device arranged at the discontinuity point in the mechanical support of the sheets to be transferred. A guide device, which extends transversely to the transport direction of the sheets and comprises a tapered profile element, is arranged at the discontinuity point. The guide device is arranged at the discontinuity point between the two conveyor belts and is arranged consecutively in the transport direction of the sheets. The tip of the profile element is oriented toward the relevant conveyor belt of the first transport device counter to the transport direction of the sheets. The tip of the profile element is spaced by a gap apart from the relevant conveyor belt of the first transport device which is diverted at the rotating diverting roller. The gap between the tip of the profile element and the relevant conveyor belt of the first transport device which is diverted at the rotating diverting roller has a width in the range between 1 mm and 5 mm. A control unit and at least one lifting nozzle are provided, and the processing station arranged directly downstream from the processing station comprising the first transport device is configured as a suction belt feed table.

BACKGROUND

The suction belt feed table described hereafter is a machine unit for use in a machine system that processes sheet-format substrates (referred to as sheets for short), wherein such a machine system comprises several machine units arranged consecutively in the transport direction of the sheets. At least two of these machine units in each case comprise the sheet-transporting transport devices. A suction belt feed table is used to transport sheets that have been processed, or are to be processed, along a linear transport section in the relevant machine system, wherein these sheets are transported on at least one conveyor belt, resting individually thereon. While the individual sheets rest on the at least one conveyor belt, each sheet is held at the relevant conveyor belt in a frictionally engaged or force-fit manner by a suction force, i.e., by a retaining force induced by a suction flow. The suction force is generally achieved by a vacuum pressure that engages on the particular sheet and is adjusted with respect to the ambient atmospheric pressure by means of a suction device.

In a preferred use, the suction belt feed table is arranged in a sheet-processing machine system downstream from a dryer drying the sheets, in the transport direction of the sheets. In a refining embodiment, the dryer is first followed by a cooling section for controlling the climate and/or air conditioning the sheets heated in the dryer, so that the suction belt feed table is not arranged until after the cooling section. A machine system of the aforementioned design, be it with or without a cooling section downstream from the dryer, in general comprises several processing stations that are arranged one behind the other in the transport direction of the sheets and that each act on the sheets, wherein each of these processing stations is, for example, configured as a machine unit in this sheet-processing machine system. As mentioned, the suction belt feed table can be arranged directly downstream from the dryer so that no further processing station is arranged between the aforementioned dryer and the suction belt feed table, or it may only be arranged subsequent to the cooling section formed downstream from the dryer. In the machine system used here as the basis for a preferred embodiment, at least the transport device of the dryer arranged upstream from the suction belt feed table or of the associated cooling section is configured as a transport device transporting the sheets lying flat along a linear transport section. The dryer is thus in particular configured as a continuous-flow dryer for sheets in individual layers.

Another transport device that is arranged downstream from the suction belt feed table in the transport direction of the sheets is configured as a transport device that transports the sheets along a curved, in particular circular arc-shaped transport section. This further transport device is preferably arranged directly downstream from the suction belt feed table, i.e., no further processing station is arranged in the relevant machine system between the suction belt feed table and the downstream transport device. After leaving the suction belt feed table, the sheets to be transported through this machine system thus switch from a linear transport section to a curved, in particular circular arc-shaped transport section. As will be apparent hereafter, switching from a linear transport section to a curved, in particular circular arc-shaped transport section at a suction belt feed table at times brings with it extensive problems.

A sheet transport assembly for transporting a sheet along a process unit configured for applying a process to the sheet is known from U.S. Pat. No. 9,573,780 B2, the sheet transport assembly comprising the following: a conveying unit including a transport belt and a deflection element, the transport belt being configured for advancing the sheet in a transport direction along the process unit to the deflection element, the sheet being placed with a contact side on the belt and with a process side towards the process unit, and the deflection element being arranged in contact with the transport belt to deflect the transport belt downstream in the transport direction relative to the process unit; a separating unit for separating the sheet from the transport belt, the separating unit being connected to an air supply source and including a restrain blowing device arranged for directing a restrain air flow onto the process side of the sheet in a restrain area for urging the sheet towards the transport belt proximate to the deflection element arranged for separating the sheet from the transport belt; and comprising a lifting blowing device arranged for directing a lifting air flow onto the contact side of the sheet in a lifting area for lifting the sheet from the transport belt, the lifting region being arranged extending only over a middle portion of a width of the sheet, and the width being a dimension of the sheet in a lateral direction perpendicular to the transport direction.

A sheet transport assembly for transporting a sheet between two conveyors is known from US 2016/0152045 A1, the sheet transport assembly comprising: a) a supplying conveyor comprising a transport belt, the supplying conveying being configured for advancing the sheet in a transport direction along a process unit, which is configured for applying a process to a process side of the sheet, to a transfer area for transferring the sheet to a receiving conveyor, the sheet having a contact side that is in contact with the transport belt; b) a sheet blowing unit coupled to an air supply source, the sheet blowing unit comprising an air knife arranged for directing an air flow onto the process side of the sheet, the process side being opposite to the contact side, for urging the sheet towards a supporting element for supporting the sheet during its transport in the transfer area, wherein the sheet transport assembly furthermore comprises a control unit configured for controlling the sheet blowing unit in response to at least one sheet attribute of the sheet comprising a media characteristic of the sheet, wherein said media characteristic defines a curl deformation behavior of the sheet.

A printing press is known from US 2020/0017310 A1, comprising a first conveyor belt and a downstream, second conveyor belt for transporting sheets and, arranged therebetween, a guide element for the sheets, wherein a blower device is provided to lift a leading edge of the respective sheet in the region of the transition from the first conveyor belt to the guide device, the blower device preferably being arranged upstream from the guide element, as viewed in the transport direction of the sheets.

A sheet processing machine is known from DE 10 2017 212 984 A1, wherein at least one protrusion sensor for detecting at least a spatial extent of sheets is arranged along a transport path provided for a transport of sheets, and wherein at least one compression device is provided, which comprises at least one first compression member and at least one second compression member and at least one force element, the at least one compression member being arranged so as to be movable by means of the at least one force element from a pass-through position toward the at least one second compression member into a compression position, and, when the first compression member is arranged in the pass-through position, the at least one force element being preloaded, and the at least one compression device comprising at least one retention device, which can be switched at least between a retention state and a release state and, when in the retention state, is arranged so as to prevent the at least one first compression member from moving out of its pass-through position into its compression position.

A digital printing machine is known from US 2018/0072076 A1, comprising: a first sheet-conveying belt made of a first material; a second sheet-conveying belt made of a second material; a print head for printing on a front side and a back side of a print sheet, the print head being directed towards the first sheet-conveying belt; a reversing device for reversing the print sheet between receiving a print on the front side and receiving a print on the back side; and a drier for drying a print that has been printed onto the print sheet by using the print head, the drier being directed towards the second sheet-conveying belt.

A sheet-processing machine system comprising a suction belt feed table arranged downstream from a dryer drying the sheets is known from DE 10 2016 207 397 A1.

A device comprising a blower unit for separating moved sheets from a conveyor belt transporting the sheets is known from US 2009/0190981 A1, wherein the blower unit, in its center portion, blows air in a direction substantially counter to and orthogonal to the direction of movement of the sheets and, in a side portion, blows air in a direction substantially counter to and laterally from the direction of movement of the sheets.

SUMMARY

An object of the invention is to provide a printing press comprising a non-impact printing device.

This object is achieved according to some examples herein by a printing press including a non-impact printing device, the printing press further including a plurality of processing stations that each process sheets as discussed above. In the printing press, the at least one lifting nozzle is arranged in the profile element of the guide device. The relevant lifting nozzle is configured to open in the direction of the tip of the profile element. The suction belt feed table includes a catching device having a catching position, which is assumed as a result of an actuation, for adjacent individual sheets that follow one another, and the catching device, in its catching position, catches sheets on the suction belt feed table that are fed from the first transport device, which is arranged upstream from the suction belt feed table, to the suction belt feed table before they are transferred in each case to a transport device arranged downstream from the suction belt feed table and stacked.

The advantages achievable by the invention are in particular that a transfer of sheets that is devoid of disruptions is made possible in the digital printing press between its processing stations. Further advantages are apparent from the following description.

BRIEF DESCRIPTION OF THE DRAWINGS

Exemplary embodiments of the invention are illustrated in the drawings and will be described in greater detail below. The drawings show.

DETAILED DESCRIPTION

Figure 1:
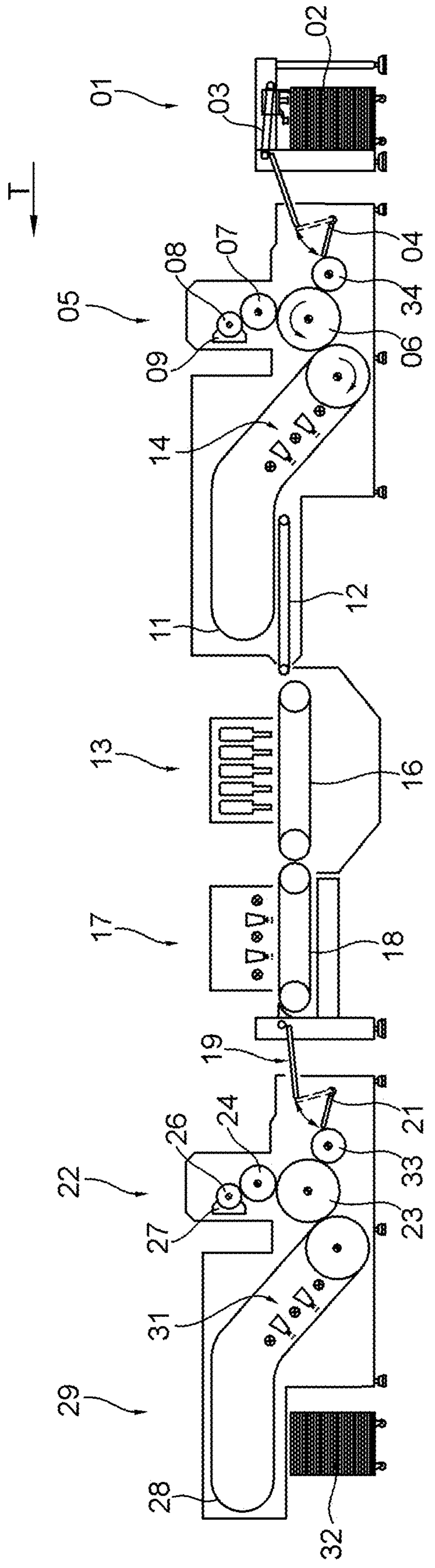
FIG. 1 a suction belt feed table in a sheet-processing machine system.

One example of the machine system mentioned at the outset is shown in FIG. 1. Such a machine system is known, for example, from DE 10 2016 207 397 A1. Viewed in the transport direction T of the sheets, the sheet-processing machine system selected as an example first comprises a sheet feeder 01, in which a first pile 02 of sheets is awaiting processing. The sheets are preferably rectangular substrates made of paper, paperboard or cardboard. The paper, paperboard and cardboard differ in terms of their respective weight referred to as grammage, i.e., the weight of these sheets in grams per square meter. The grammage of paper is between 30 $g/m^2$ and 150 $g/m^2$, that of paperboard is between 150 $g/m^2$ and 600 $g/m^2$, and that of cardboard is more than 600 $g/m^2$. However, the sheets can also in each case be embodied as a substrate made of a plastic material and/or as a thin panel. The sheet feeder 01 can also be configured as a magazine feeder comprising several first piles 02.

A suction head 03 consecutively grips each of the stacked sheets from the top and feeds these sheets, for example by means of a first rocking gripper 04, and possibly a transfer drum 34 cooperating with the first rocking gripper 04, in a sequence of sheets separated from each other, for example, to a first coating device 05, wherein this first coating device 05 is configured, for example, as a primer application device. The first coating device 05 comprises a transport cylinder 06, configured, for example, as a printing cylinder, and, for example, a printing unit cylinder 07 cooperating with this transport cylinder 06, comprising a forme roller 08, preferably in the form of an anilox roller, that is placed against, or at least can be placed against, this printing unit cylinder 07, wherein at least one squeegee 09 or a chamber doctor blade system 09 extends in the axial direction of the forme roller 08 for optimally metering a coating substance to be applied to the surface of the sheets. The transport cylinder 06 transports the sheets held on its outer cylindrical surface along a curved, in particular circular arc-shaped transport section. The first coating device 05 applies the coating substance, for example a primer, on one of the two sides of the sheets either across the entire surface area or only in certain, i.e., in previously defined, locations, i.e., partially. The sheets are then transferred from the transport cylinder 06 of the first coating device 05, for example by means of a first gripper system 11, in particular a first chain conveyor, and, for example, at least one first conveyor belt 12, to a non-impact printing device 13, wherein the first gripper system 11 and the first conveyor belt 12 cooperate during the transfer of the sheets to the non-impact printing device 13, and more particularly in such a way that the first gripper system 11 turns the sheets in each case over to the first conveyor belt 12 comprising a linear transport section, wherein a transfer of the sheets to the non-impact printing device 13 takes place from the first conveyor belt 12. The first conveyor belt 12 is preferably configured as a revolving continuous belt. In an advantageous embodiment, a first dryer 14 drying the sheets coated in the first coating device 05 is provided in the region of the first gripper system 11, wherein this dryer 14 is configured, for example, as a hot air dryer and/or as a dryer drying by IR radiation or by UV radiation.

The non-impact printing device 13 generally comprises at least four ink jet printing devices, which can each be controlled independently of one another, wherein each of these ink jet printing devices, for creating a preferably multi-color print image, in each case applies a different printing ink onto the side of the sheets that, for example, was previously coated in the first coating device 05. The non-impact printing device 13 preferably comprises a second conveyor belt 16 in the machine system described by way of example here, so that the sheets are printed by the ink jet printing devices while they rest on this second conveyor belt 16. The second conveyor belt 16 is preferably configured as a revolving continuous belt. However, it is also possible for several conveyor belts 16 to be provided, for example two, which are arranged parallel to one another in the transport direction T of the sheets. A second dryer 17 drying the printed sheets is arranged downstream from the non-impact printing device 13 in the transport direction T of the sheets, wherein this second dryer 17 is likewise configured, for example, as a hot air dryer and/or as a dryer drying by IR radiation or by UV radiation. The second dryer 17 comprises a transport device 18, which transports the sheets lying flat in a translatory manner, i.e., along a linear transport section. This transport device 18 is configured as a third conveyor belt 18 in the machine system shown by way of example in FIG. 1. The third conveyor belt 18 is also preferably configured as a revolving continuous belt. The transport device 18 of the, in this example, second dryer 17 transfers the dried sheets to a suction belt feed table 19, from which the sheets are transferred, for example by means of a second rocking gripper 21, and possibly a transfer drum 33 cooperating with the second rocking gripper 21, to a second coating device 22. The second coating device 22 is configured, for example, as a varnishing unit, wherein this second coating device 22 applies a coating substance, for example a varnish, in particular to a print image previously created in the non-impact printing device 13. The second coating device 22, in turn, comprises a transport cylinder 23 configured, for example, as a printing cylinder, serving as the transport device for sheets to be transported, wherein, for example, a printing unit cylinder 24 including a forme roller 26 that is placed against, or at least can be placed against, this printing unit cylinder 24, preferably in the form of an anilox roller, cooperates with this transport cylinder 23, wherein at least one squeegee 27 or a chamber doctor blade system 27 extends in the axial direction of the forme roller 26.

The sheets are then transported from the transport cylinder 23 of the second coating device 22, for example by means of a second gripper system 28, in particular a second chain conveyor, to a delivery 29, wherein the sheets processed in this machine system, described by way of example, are preferably deposited by the second gripper system 28 in the delivery in a second pile 32. In an advantageous embodiment, a third dryer 31 drying the sheets coated in the second coating device 22 is provided in the region of the second gripper system 28, wherein this third dryer 31 is configured, for example, as a hot air dryer and/or as a dryer drying by IR radiation or by UV radiation. The delivery 29 can also be configured as a multi-pile delivery comprising several second piles 32. The machine system shown by way of example in FIG. 1 is configured as a digital printing press for use in an industrial printing process, in particular for mass-producing printed products.

Figure 2:
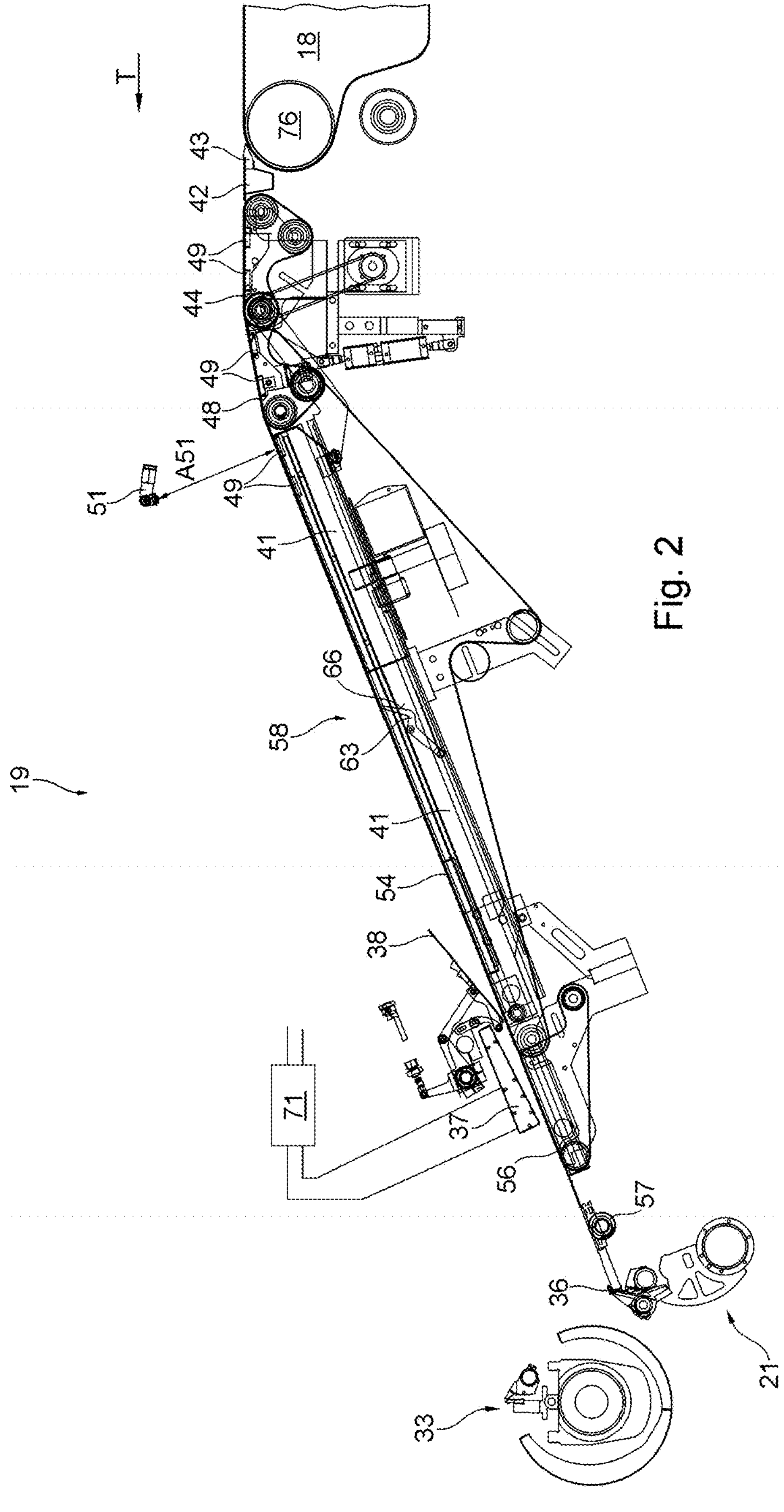
FIG. 2 a side view of the suction belt feed table according to FIG. 1.

FIG. 2 shows a side view of the suction belt feed table 19, such as it is arranged, for example, in a machine system according to FIG. 1. The transport direction T of the sheets is oriented from right to left in FIG. 2. The suction belt feed table 19 is fed individual sheets sequentially by a transport device 18, which is only partially shown in FIG. 2, at a transport speed of several thousand sheets per hour, for example, of approximately 10,000 sheets per hour. In the process, individual sheets that are adjacent to one another in their transport direction T, i.e., that directly follow one another in the sequence, are in each case spaced apart from each other by a gap. This gap is significantly smaller than a length of the sheets extending in the transport direction T of the sheets and is only a few millimeters, for example, approximately 20 mm. In the preferred embodiment here, the transport device 18 arranged upstream from the suction belt feed table 19 in the transport direction T of the sheets forms part of a dryer 17, wherein this dryer 17 according to the machine system shown by way of example in FIG. 1 is a second dryer 17, wherein the sheets are transported lying flat, in particular in each case lying flat on a conveyor belt in a translatory manner, i.e., along a linear transport section, through this transport device 18. The suction belt feed table 19 initially receives every single sheet in a conveying plane, which is defined by the transport device 18 arranged upstream from this suction belt feed table 19 and, in theory, is extended in the transport direction T of the sheets, wherein this conveying plane is preferably horizontally oriented. During the further course of the transport path of the sheets, the conveying plane E19 (FIG. 4) of the suction belt feed table 19 has a downwardly oriented inclination at an acute angle in the range between 5° and 30°, preferably in the range between 15° and 25° in relation to the horizontal conveying plane of the transport device 18 arranged upstream from this suction belt feed table 19. At the end of the transport path determined by the suction belt feed table 19, each sheet strikes with its forward edge in the transport direction T against front lay marks 36 of the rocking gripper 21 arranged downstream from the suction belt feed table 19, wherein this rocking gripper 21 is a second rocking gripper 21 in the machine system shown by way of example in FIG. 1. Each sheet is transferred individually from this rocking gripper 21 to a transfer drum 33 cooperating with this rocking gripper 21. The sheets are completely decelerated and aligned true to register at the front lay marks.

In its preferred embodiment, the suction belt feed table 19 comprises a shingling device for sheets to be transported. Above the conveying plane E19 of the suction belt feed table 19, the shingling device comprises a box-shaped housing that preferably extends across the entire width of the sheets, i.e., transversely to the transport direction T of the sheets, the so-called blower module 37, wherein several blower nozzles are arranged one behind the other in the transport direction T of the sheets in the blower module 37 on its side facing the conveying plane E19 of the suction belt feed table 19. In the preferred embodiment, at least two rows of several blower nozzles, which are each arranged side by side, are arranged one behind the other in the transport direction T of the sheets and in each case transversely to the transport direction T of the sheets. A respective blowing direction of the blower nozzles is oriented substantially parallel to the conveying plane E19 of the suction belt feed table 19, counter to the transport direction T of the sheets. The respective blowing direction of the blower nozzles is, for example, established by at least one guide surface, which in each case channels the flow of the blower air and in each case is arranged and/or integrally formed on the relevant blower nozzle. The respective guide surface is formed on the side of the blower module 37 which faces the conveying plane E19 of the suction belt feed table 19, for example in the form of a ramp projecting from this blower module 37. A blower air flowing out of the respective blower nozzles is preferably controlled, for example in terms of time and/or in terms of the intensity, by adjustable pneumatic valves, wherein the valves, for example, have been or are controlled by a preferably digital control unit 71 executing a program. The valves are, for example, switched by a control unit 71, in particular in a cycle, wherein a cycle duration and/or a cycle frequency preferably are or have been adjusted as a function of the advancement of the sheets fed to the suction belt feed table 19. Valves controlled in a cycle by a preferably digital control unit 71 are also referred to as cycle valves.

In the transport direction T of the sheets, a baffle plate 38 is arranged in a region between the conveying plane E19 of the suction belt feed table 19 and the side of the blower module 37 which faces this conveying plane E19, upstream from the first blower nozzle or the first blower nozzle row, wherein the baffle plate 38 shields the leading edge of a follower sheet, i.e., a sheet that directly follows a sheet that has been lifted by the blower air of at least one of the blower nozzles of the blower module 37, against the suction action caused by the blower nozzles arranged in the blower module 37. The sheet lifted off the conveying plane E19 of the suction belt feed table 19 by at least one of the blower nozzles or blower nozzle rows of the blower module 37 channels the blower air flowing out of the at least one blower nozzle of the blower module 37, and guides this blower air over the surface of the baffle plate 38 which faces the blower module 37. At its end located in the blowing direction, the baffle plate 38 preferably has a concave curvature, wherein this curvature imparts an outflow direction which faces away from, i.e., is oriented away from, the conveying plane E19 of the suction belt feed table 19 to the blower air. As a result of the baffle plate 38, the leading edge of a sheet that directly follows the sheet lifted by the blower air of at least one of the blower nozzles remains uninfluenced until the lifted sheet, due to its own movement progress or advancement oriented in the transport direction T, with its rear end exposes the blower nozzle or blower nozzle row that is first reached by this sheet in its transport direction T. So as to prevent the leading edge of the sheet which directly follows a sheet lifted by the blower air of at least one of the blower nozzles from being lifted too soon by the action of the blower nozzle or blower nozzle row exposed by the rear end of the preceding sheet, the blower air of the relevant blower nozzle or blower nozzle row is shut off by means of the respective associated valve, as a function of the movement progress or advancement of the sheet directly preceding the sheet that is presently lifted off the conveying plane E19 of the suction belt feed table 19 and situated between the baffle plate 38 and the conveying plane E19 of the suction belt feed table 19.

A sheet that is lifted by the blower nozzles or blower nozzle rows is lifted as a result of the suction action caused by the respective blower air (Venturi effect) above the conveying plane E19 of the suction belt feed table 19 to a certain floating height that, for example, is determined by a distance with respect to the side of the blower module 37 which faces the conveying plane E19 of the suction belt feed table 19, wherein this floating height is dependent on the intensity of the respective blower air and/or on the mass of the relevant sheet and/or on the transport speed of the relevant sheet. So as to prevent sheets having, for example, a large mass and/or a high transport speed from oscillating and starting to flap while being transported in the conveying plane E19 of the suction belt feed table 19, a support plate that supports the lifted sheet is preferably provided in the region between the conveying plane E19 of the suction belt feed table 19 and the side of the blower module 37 which faces this conveying plane E19, wherein the support plate, which is arranged, for example, at an acute angle with respect to the side of the blower module 37 facing the conveying plane E19 of the suction belt feed table 19, is configured, for example, in the form of an air-permeable grate. There, the sheet that has been lifted by the suction of the blower air and placed against the support plate is guided in a calm movement, i.e., without flapping, in its transport direction T along this support plate. Preferably, several openings 39 (FIG. 3) are provided in the conveying plane E19 of the suction belt feed table 19, at least in a region opposite the blower module 37, through which additional air flows beneath the currently lifted sheet for pressure equalization. These openings 39 are circular, for example, having a diameter in the range of a few millimeters. Moreover, several suction chambers 41, whose respective flow action can be controlled, are arranged beneath the conveying plane E19 of the suction belt feed table 19. These suction chambers 41 are preferably arranged one behind the other in the transport direction T of the sheets and can be switched in terms of their respective pressure, for example, by means of a suction device controlled by the control unit 71, in particular individually and independently of one another.

Figure 3:
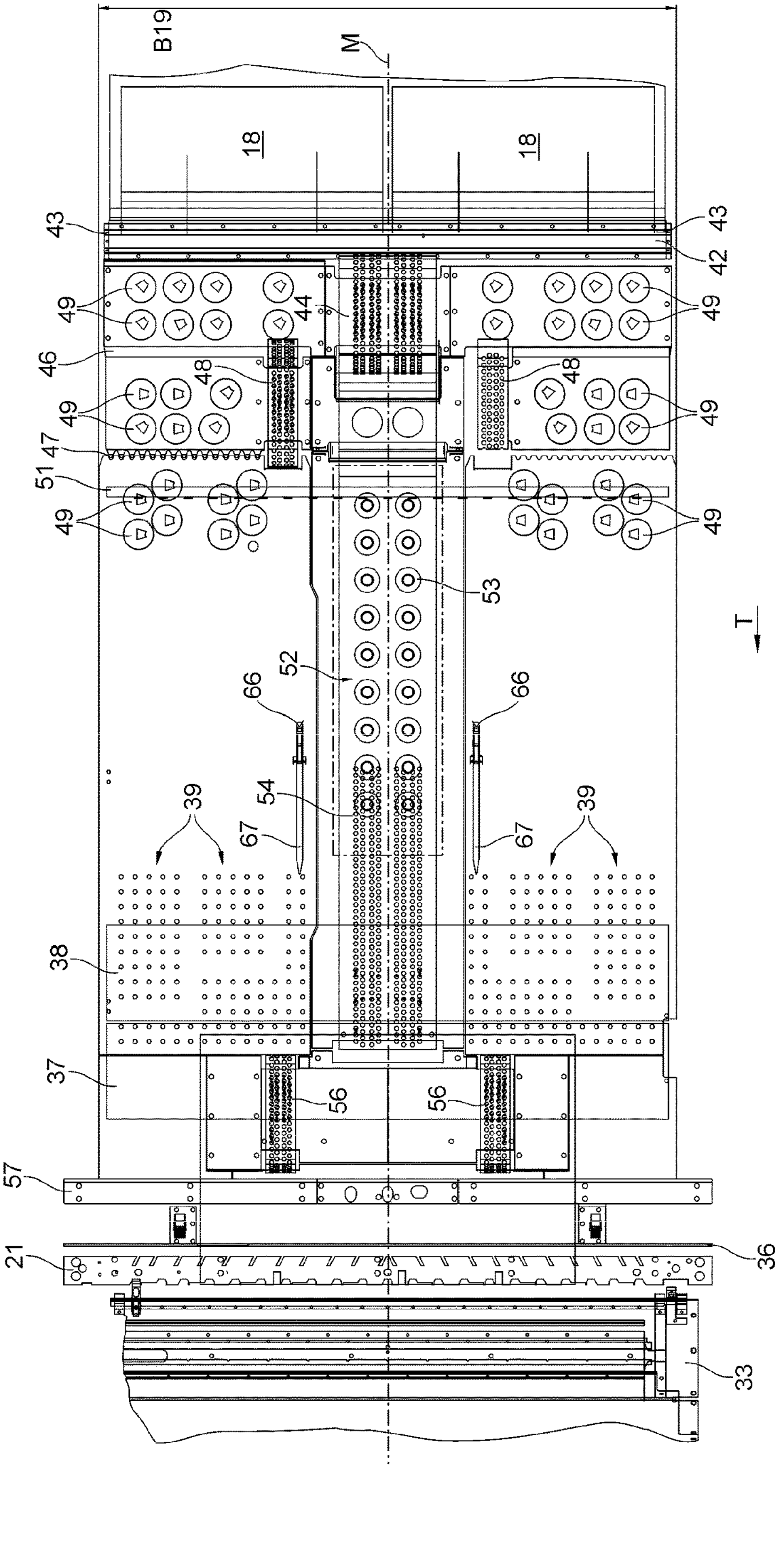
FIG. 3 a top view of the suction belt feed table shown in FIG. 2.

FIG. 3 shows a top view of the suction belt feed table 19 shown in FIG. 2. The transport direction T of the sheets is oriented from right to left, as in FIG. 2. Individual sheets are sequentially fed to the suction belt feed table 19 by a transport device transporting the sheets in a translatory manner, in particular by a transport device that forms part of a dryer 17. Each of the sheets rests at least on one conveyor belt 18, preferably on several, for example on two conveyor belts 18, which are arranged parallel to one another in the transport direction T of the sheets. These conveyor belts 18 are in each case configured, for example, as continuously revolving flat belts. A guide device 42 that extends transversely to the transport direction T of the sheets and has preferably several lifting nozzles 43 arranged in at least one row is arranged at the transition from the transport device arranged upstream from the suction belt feed table 19 to this suction belt feed table 19. In the transport direction T of the sheets, this is followed by at least one receiving belt 44, which, for example, is configured as a revolving flat belt arranged in the center region of the conveying plane E19 of the suction belt feed table 19 and moreover is preferably configured as a suction belt, wherein the suction belt has a perforation at least in sections. In the transport direction T of the sheets, the receiving belt 44 or its operating zone in the conveying plane E19 of the suction belt feed table 19 is followed by at least one kink 46, preferably several successive kinks 46; 47 for an incremental curvature of the previously, for example, horizontal conveying plane, wherein the conveying plane E19 of the suction belt feed table 19, at each of these kinks 46; 47, in each case experiences a possibly further downwardly oriented inclination at an acute angle in the range between 5° and 30° compared to the prior orientation of the conveying plane. In the example shown in FIGS. 2 and 3, two successive kinks 46; 47 are shown, wherein the first kink 46 is arranged in the operating zone of the receiving belt 44, and the second kink 47 is arranged a small distance of less than one sheet length downstream from the receiving belt 44 in the transport direction T of the sheets. In the conveying plane E19 of the suction belt feed table 19, for example spanning the distance between the kinks 46; 47 symmetrically to the center line M of the table, preferably two ramp belts 48, which are arranged parallel to one another in the transport direction T of the sheets, are provided, for example in the form of respectively revolving continuous belts, which are preferably each configured as a suction belt. At their rear end in the transport direction T of the sheets, which a sheet, in particular when approaching from the receiving belt 44, reaches first, the ramp belts 48 are pivotably mounted so that these ramp belts 48 can be pivoted obliquely upwardly, at an acute angle opening in the transport direction T of the sheets, and out of the previous conveying plane E19 of the suction belt feed table 19 and, in their pivoted-out operating state, form an upright ramp for the sheets to be transported. In FIG. 2, the ramp belts 48 are shown in their normal, i.e., not pivoted-out operating state, in which they preferably end flush with the remaining conveying plane E19 of the suction belt feed table 19. In a preferred embodiment, several nozzles 49, which are preferably each configured as Venturi nozzles, are in each case arranged at least in the respective edge regions on the longitudinal side of the region of the conveying plane E19 of the suction belt feed table 19 which is spanned by the ramp belts 48. This arrangement of the Venturi nozzles starts, in the transport direction T of the sheets, at a distance of, for example, less than 200 mm, preferably less than 100 mm downstream from the at least one lifting nozzle 43.

Above the conveying plane E19 of the suction belt feed table 19, a catch blower 51 extending transversely to the transport direction T of the sheets is arranged (FIGS. 2 and 3) at a distance A51, wherein this catch blower 51 comprises several blower nozzles arranged in a row that extends across the entire width B19 of the conveying plane E19 of the suction belt feed table 19. Beneath the catch blower 51, a switching region 52 that extends in the transport direction T of the sheets and has several suction boreholes 53 begins in the conveying plane E19 of the suction belt feed table 19, in particular in its center region. The suction boreholes 53 in the switching region 52 form and open up a flow connection to at least one of the preferably several suction chambers 41, which are each arranged beneath the conveying plane E19 of the suction belt feed table 19, wherein these suction chambers 41 are switched, or at least can be switched, in terms of their respective pressure by the control unit 71, in particular individually and independently of one another, so that, in this switching region 52, a vacuum pressure is adjusted, or at least can be adjusted, by means of the suction boreholes 53 and by the respective adjustment of the pressure in the relevant suction chamber 41 in the conveying plane E19 of the suction belt feed table 19. The suction boreholes 53 provided in the switching region 52 are arranged, for example, symmetrically with respect to the center line M of the conveying plane E19 of the suction belt feed table 19 in several, for example two rows, and are in each case configured as suckers utilizing the Bernouilli effect. In the transport direction T of the sheets, the switching area 52 is followed, for example in a manner overlapping with the switching area 52, by at least one feed belt 54 that is in particular configured as a suction belt, wherein the suction belt has a perforation at least in sections, wherein the at least one feed belt 54 extends in the transport direction T of the sheets, preferably to beneath the blower module 37 of the shingling device. The at least one feed belt 54 is preferably configured as a revolving continuous belt. In a preferred embodiment, several, for example two feed belts 54 are provided, for example symmetrically with respect to the center line M of the conveying plane E19 of the suction belt feed table 19. The region that extends in the conveying plane E19 of the suction belt feed table 19 opposite the blower module 37 and in which preferably several openings 39 (FIG. 3) are provided, through which additional air flows beneath a sheet currently lifted by the shingling device for pressure equalization, extends on the edge side in the conveying plane E19 of the suction belt feed table 19, in the transport direction T of the sheets, at least partially longitudinally in relation to the at least one feed belt 54.

In the transport direction T of the sheets, the at least one feed belt 54 and/or the shingling device are followed, in the conveying plane E19 of the suction belt feed table 19, by braking belts 56, which are arranged symmetrically with respect to the center line M and are preferably each configured as a revolving continuous belt, and which have the function of reducing the respective transport speed of approaching sheets prior to them being transferred to a transport device arranged directly downstream from the suction belt feed table 19, for example to a rocking gripper 21. The sheets, whose respective transport speed has preferably been reduced, are then gripped, during their further movement progress oriented in the transport direction T, by a rotating, or at least rotatable, suction roller 57, to which a suction device applies a vacuum pressure, wherein this suction roller 57 extends transversely to the transport direction T of the sheets, preferably at least across the entire width of the sheets or across the entire width B19 of the suction belt feed table 19. Thereafter, each of the sheets consecutively and individually, in each case held by the suction roller 57, arrives with its forward edge in the transport direction T, i.e., its leading edge, for example at the front lay marks 36 of the rocking gripper 21 arranged directly downstream from the suction belt feed table 19. A cooperation between the shingling device, the braking belts 56, the suction roller 57 and the front lay marks 36 of the rocking gripper 21 causes the sheets, which previously were transported individually lying flat, one behind the other, in each case with a gap with respect to one another, to be transferred into an imbricated stream before these sheets are transferred to a transport device arranged directly downstream from the suction belt feed table 19, for example to a rocking gripper 21, so as to then be rotationally transported in a machine system, which comprises this suction belt feed table 19 and is configured, for example, as a digital printing press, to a coating device 22, for example to a conveying device 22 configured as a varnishing unit, and through the same.

During the operation of such a machine system, in particular in the industrial printing process of a digital printing press, it is possible for disruptions to occur occasionally, for various reasons, in a processing station arranged downstream from the suction belt feed table 19 and, for example, configured as a coating device 22. The result of a serious disruption in such a processing station is that the transfer of sheets to the transport device arranged downstream from the suction belt feed table 19 has to be abruptly interrupted. This operating case creates a stoppage. In the case of a stoppage, sheets being transported in the machine system must be collected and stacked very quickly and effectively. In a machine system forming a digital printing press, however, it is not possible due to the design circumstances, in particular due to a lack of necessary vertical space, to collect and stack a multiplicity of sheets that are being transported one behind the other in rapid succession, i.e., closely together at a high transport speed, in a processing station arranged upstream from the suction belt feed table 19, such as in a first coating device 05 or in the non-impact printing unit 13 or in a dryer 17 arranged downstream from the non-impact printing unit 13. Arranging an ejection means downstream from the dryer 17, which is arranged downstream from the non-impact printing unit 13, and upstream from the suction belt feed table 19 in the transport direction T of the sheets is not a satisfactory solution, wherein, in the event of a stoppage, this ejection means guides all sheets that are still exiting the dryer 17 arranged downstream from the non-impact printing unit 13 to beneath the suction belt feed table 19 and deposits them there. The reason is that the deposition of the sheets there is not entirely possible in an orderly manner. This solution moreover has the disadvantage that sheets collected beneath the suction belt feed table 19 can only be removed again under very unfavorable ergonomical conditions. In addition, there is almost no possibility to arrange necessary conveying elements in the region of the ejection means for the stream of individual sheets from the dryer 17, which must be received during undisturbed operation. Without such suitable conveying elements, however, a loss of retaining force may occur, which is used to hold the sheets that are usually considerably curved as a result of the heat input during drying. A disruption in the transport of the sheets would ensue. The resulting problem is to collect and stack the sheets on the suction belt feed table 19 prior to being transferred to the transport device arranged downstream from the suction belt feed table 19. However, it must be noted in the process that it is not possible to carry out a continuous underlapping for pile forming at the shingling device of the suction belt feed table 19. The reason is that the nozzles acting from above by way of suction on the trailing edge of the relevant sheet for underlapping have no effect at the latest with an immediately following sheet because the predecessor sheet is not transported away when the sheets are collected and thus prevents the suctioning action from acting on the next sheet therebeneath.

A suction belt feed table 19 comprising a catching device 58 is therefore proposed, wherein the catching device 58 can be used to catch and stack individual sheets following one another in a sequence on the suction belt feed table 19 before these are transferred to a transport device arranged downstream from the suction belt feed table 19. In the preferred embodiment, this suction belt feed table 19, which preferably comprises a shingling device, is arranged, in the transport direction T of the sheets, downstream from a dryer 17 arranged downstream from a non-impact printing unit 13. In a particularly preferred embodiment, the suction belt feed table 19 is arranged in a machine system in a location at which the sheets are transferred from a linear transport section, which is arranged directly upstream from this suction belt feed table 19, to a curved, in particular circular arc-shaped transport section, which is arranged directly downstream from this suction belt feed table 19.

The proposed catching device 58 comprises a slider crank mechanism, whose coupler has at least one stop surface 66 for the sheets to be caught. Details of the catching device 58 and of its operating principle are described hereafter based on FIGS. 4 to 6.

Figure 4:
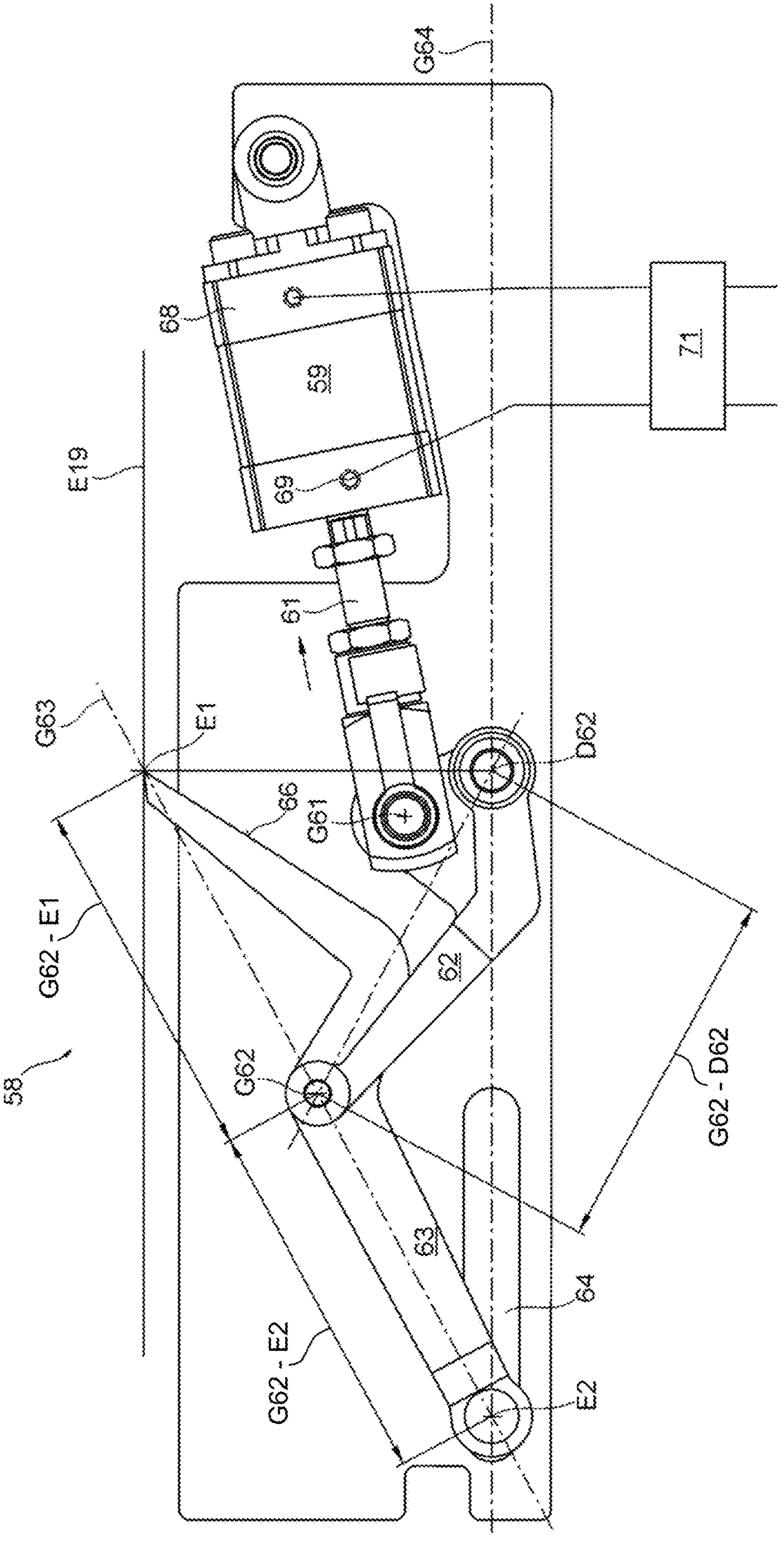
FIG. 4 a side view of a catching device integrated into the suction belt feed table.
Figure 8:
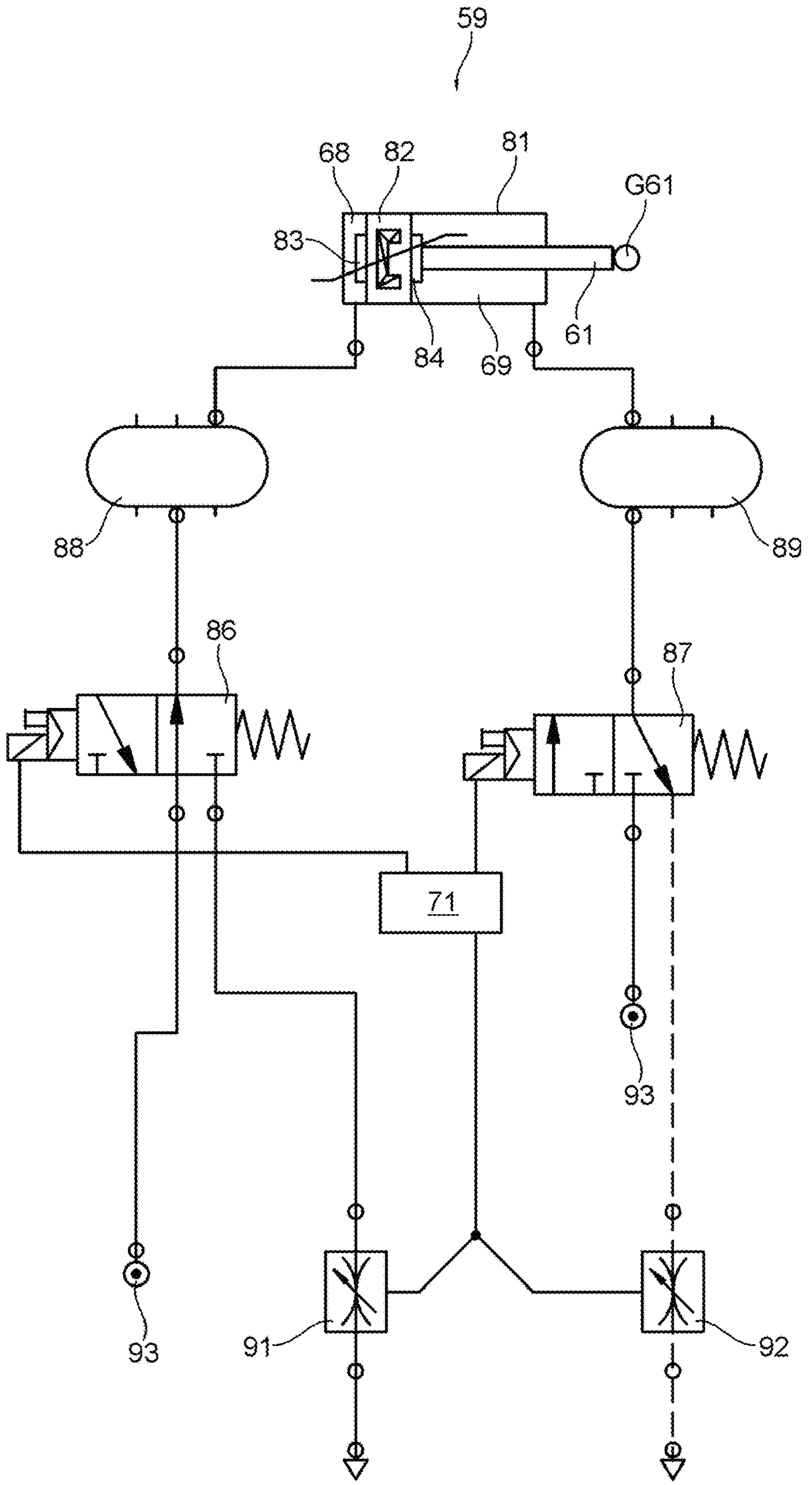
FIG. 8 a pneumatic circuit for operating the catching device.

FIG. 4 shows a side view of the catching device 58 by way of example. As long as this catching device 58 is inactive, i.e., not actuated by the control unit 71, for example, it is arranged beneath the conveying plane E19 of the suction belt feed table 19, and more particularly preferably approximately one sheet length, extending in the transport direction T of the sheets, away from a line drawn from the catch blower 51 perpendicularly to the conveying plane E19 of the suction belt feed table 19, corresponding to the distance A51, at the end of the switching region 52 of this suction belt feed table 19 which has suction boreholes 53. The catching device 58 comprises a drive 59, which is preferably configured as a double-acting pneumatic cylinder 81, to whose cylinder pistons 82 compressed air can be supplied on both sides (FIG. 8). A bidirectionally linearly movable piston rod 61 of the pneumatic cylinder 81 is connected to a crank 62 configured as an elbow lever, forming a fulcrum G61, wherein the crank 62 is rotatably mounted in a pivot point D62 that is stationary in the suction belt feed table 19. The crank 62 configured as an elbow lever comprises a short lever and a lever that is longer compared to this short lever, wherein the short lever connects the fulcrum G61, at which the piston rod 61 of the pneumatic cylinder 81 is connected to the crank 62, to the pivot point D62 of the crank 62. The crank 62, in turn, is connected to a coupler 63, forming a fulcrum G62. The longer lever of the crank 62 extends between the crank's pivot point D62 and the fulcrum G62 at which the crank 62 is connected to the coupler 63. By cooperating, the coupler 63 and the crank 62 driving the coupler 63 form a slider crank mechanism, wherein an end point E2 of the coupler 63 which faces away from the drive 59 of the catching device 58 can be moved in a bidirectional linear manner along a path 64 that is arranged parallel to the conveying plane E19 of the suction belt feed table 19. The end point E2 of the coupler 63 which faces away from the drive 59 of the catching device 58 and the pivot point D62 of the crank 62 are consequently located on a straight line G64 connecting these to one another, wherein this straight line G64 runs parallel to the conveying plane E19 of the suction belt feed table 19.

In a region between its end point E1 facing the drive 59 of the catching device 58 and the fulcrum G62, at which the crank 62 is connected to the coupler 63, the coupler 63 has at least one stop surface 66 for sheets to be caught. The relevant stop surface 66 is thus preferably an integral part of the coupler 63. The relevant stop surface 66 is preferably made of a plastic material, for example of a polyamide (abbreviated as PA) or of a thermoplastic material, such as polyoxymethylene (abbreviated as POM).

In a preferred embodiment, the slider crank mechanism comprises a centric slider crank, which means that the three sections G62-D62, G62-E2 and G62-E1 shown in FIG. 4, each have the same length, and the end points E1; E2 of the coupler 63, including the fulcrum G62 therebetween, are all located on a straight line G63 connecting the end points E1; E2 of the coupler 63 to one another. The short lever and the longer lever of the crank 62 are embodied such with respect to one another in terms of their length ratio that they multiply a movement triggered by the drive 59 of the catching device 58 and acting on the coupler 63. The multiplication ratio i is preferably at least 1:5 (i=0.2).

Figure 5:
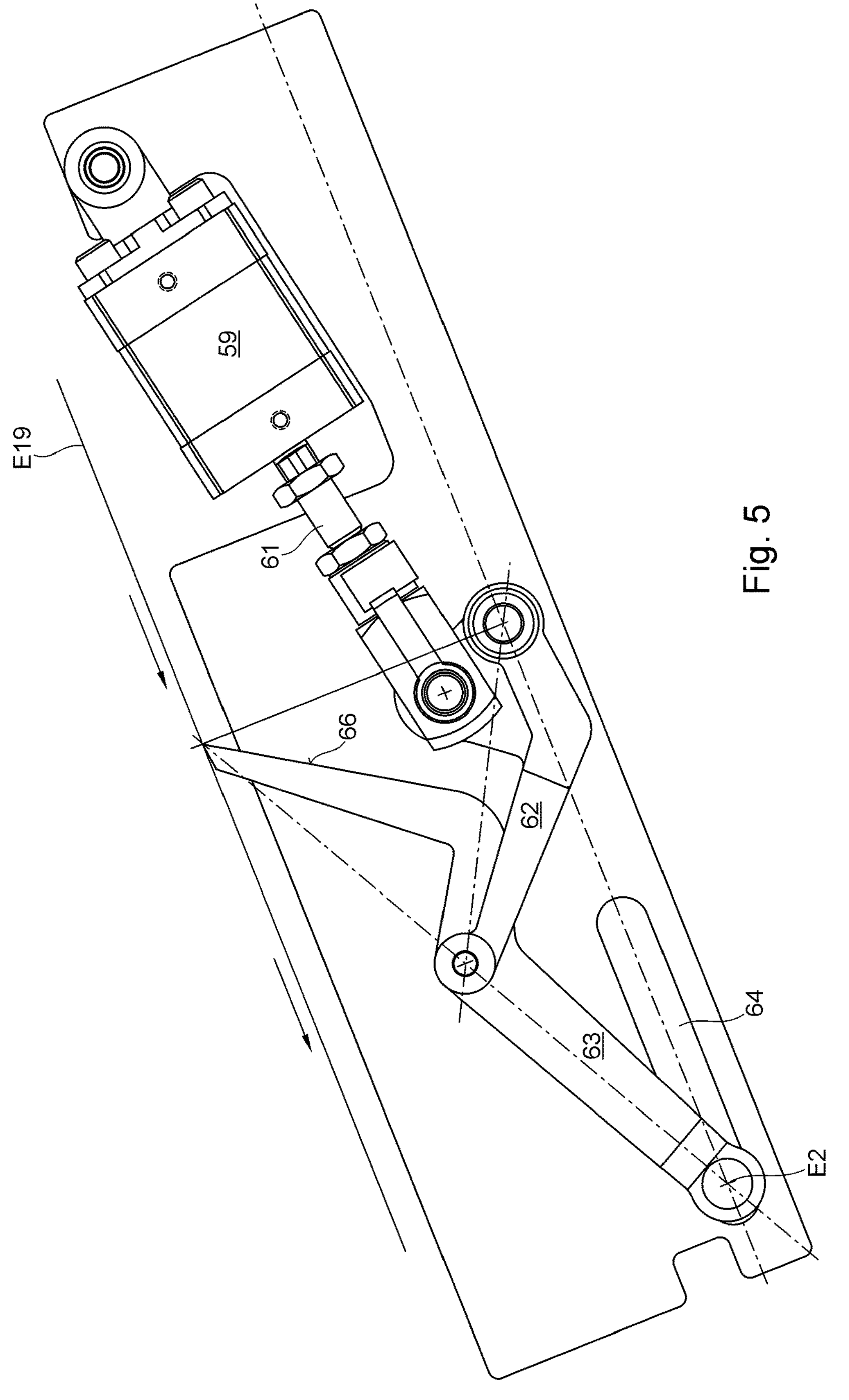
FIG. 5 the catching device of FIG. 4 in its parked position.
Figure 6:
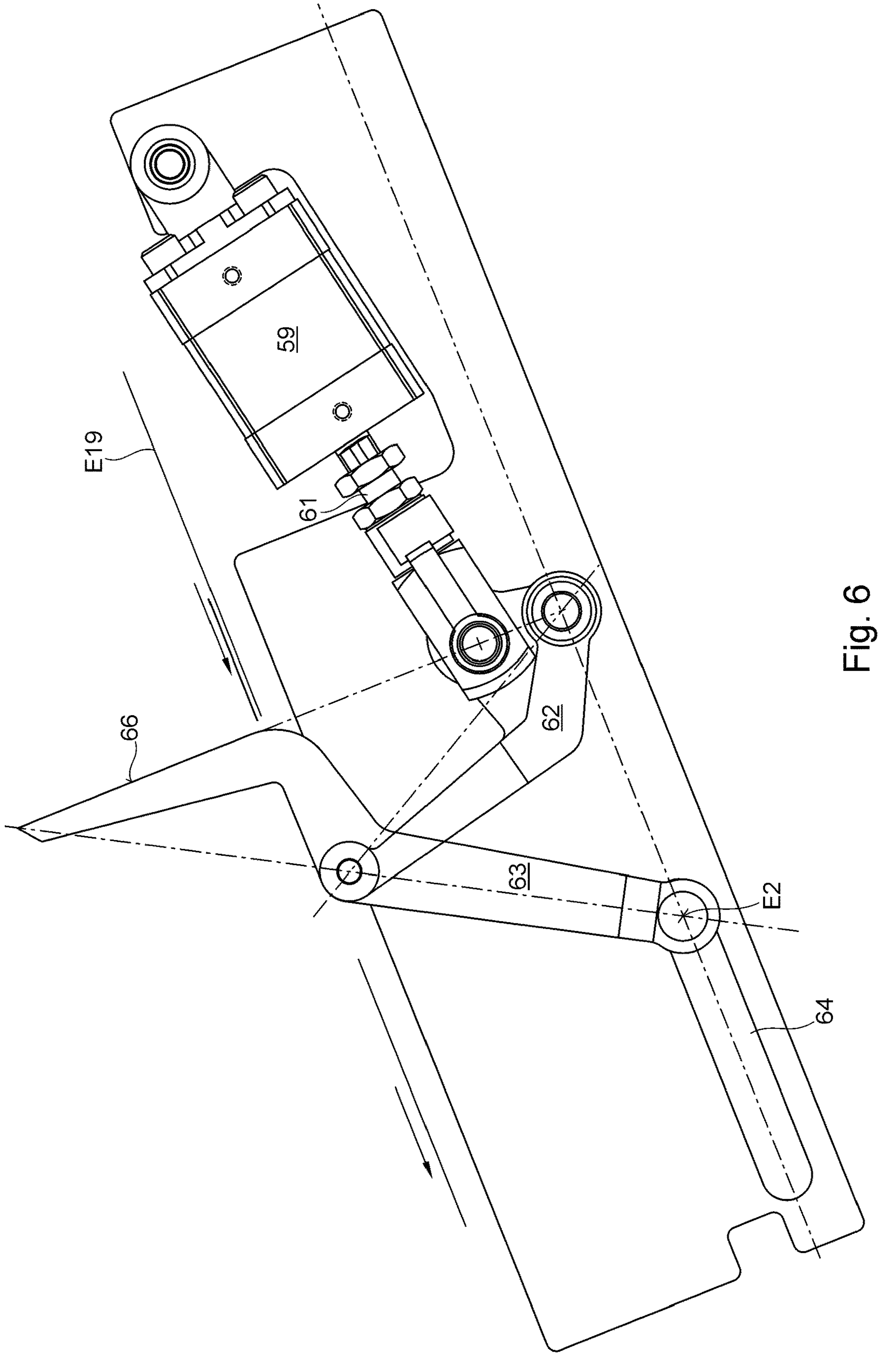
FIG. 6 the catching device of FIG. 4 in its catching position.
Figure 7:
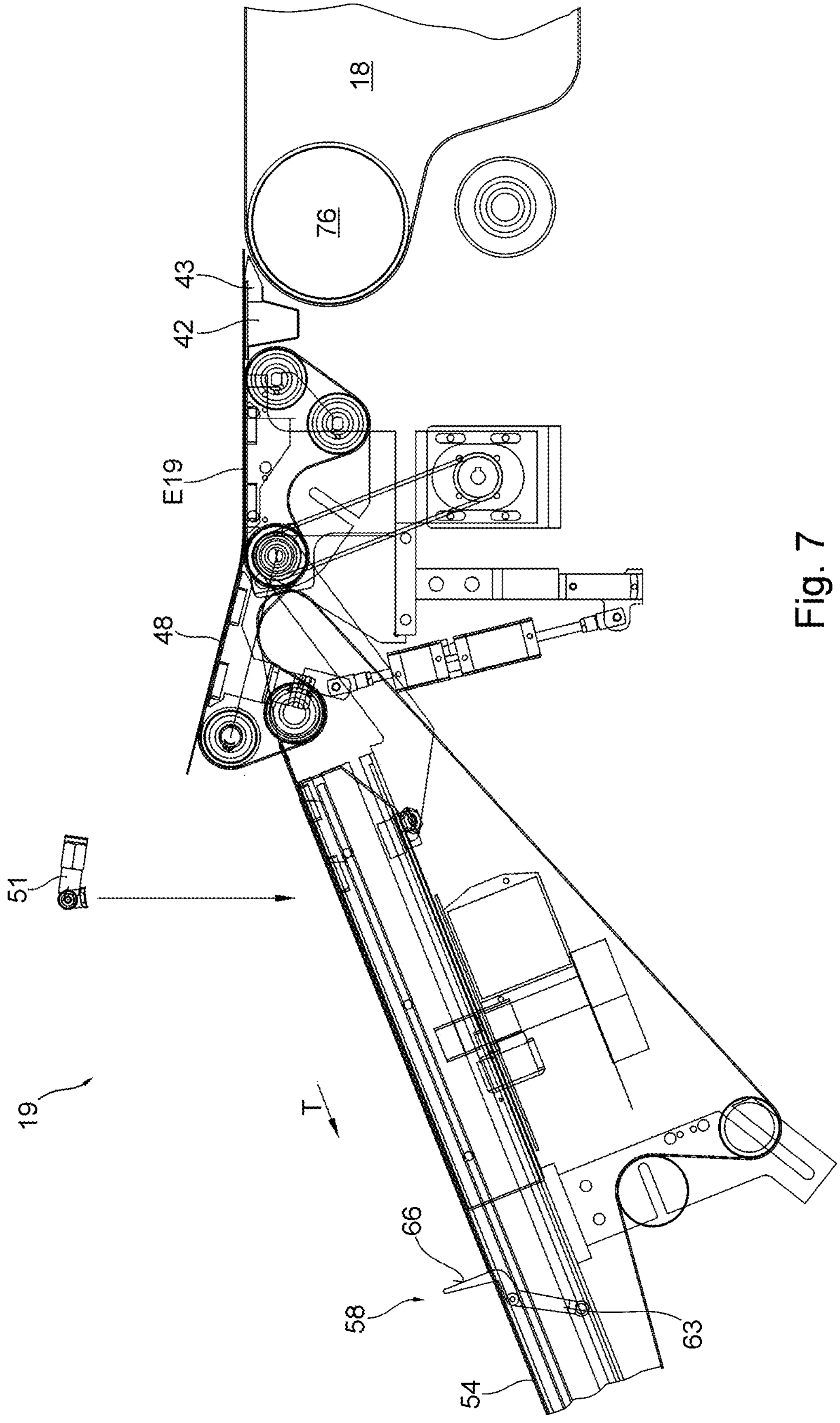
FIG. 7 a detail from FIG. 2 with the catching device in its catching position.

The operating principle of the catching device 58 is evident in conjunction with FIGS. 5 to 7. FIGS. 2 and 5 show the catching device 58 in its inactive, i.e., unactivated starting position or parked position, in which the at least one stop surface 66 formed in each case at the coupler 63 is arranged beneath the conveying plane E19 of the suction belt feed table 19. In this way, the sheets can pass the suction belt feed table 19 in its conveying plane E19 unimpaired, which is indicated in FIG. 5 by two consecutive directional arrows. As is apparent from FIG. 5, the piston rod 61 of the pneumatic cylinder 81 forming the drive 59 of the catching device 58 is extended by compressed air being supplied to this pneumatic cylinder 81, and the end point E2 of the coupler 63 which faces away from the drive 59 of the catching device 58 assumes its farthest position from the drive 59 of the catching device 58 on the path 64.

FIGS. 6 and 7 show the catching device 58 in its catching position. In the catching position, the at least one stop surface 66, which is preferably formed at the coupler 63, penetrates the conveying plane E19 of the suction belt feed table 19 through an appropriate, for example slot-shaped opening 67 (FIG. 3) and preferably, by way of a pivoting movement, moves upright from a position that, previously, was inclined at a preferably acute angle with respect to the conveying plane E19 of the suction belt feed table 19 so as to be perpendicular to this conveying plane E19 (FIGS. 6 and 7), so that sheets transported on the suction belt feed table 19 strike against the at least one upright stop surface 66, which, for example, protrudes in each case appropriately 50 mm from the conveying plane E19 of the suction belt feed table 19 (see directional arrows in FIG. 6), and in this way are caught and prevented from further movement progress that is oriented in the transport direction T. Consecutively transported sheets that each strike against the upright stop surface 66 are deposited on top of one another in the transport direction T of these sheets in front of the upright stop surface 66, and are thus stacked. In the catching position, the piston rod 61 of the pneumatic cylinder 81 forming the drive 59 of the catching device 58 is retracted by compressed air that is supplied to this pneumatic cylinder 81, and the end point E2 of the coupler 63 which faces away from the drive 59 of the catching device 58 assumes the position closest to the drive 59 of the catching device 58 on the path 64.

FIG. 7 shows a detail from FIG. 2 including the ramp belts 48, which are shown in their operating state in which they are pivoted-out upwardly from the previous conveying plane E19 of the suction belt feed table 19 at an acute angle opening in the transport direction T of the sheets, as well as a catch blower 51 that is activated, for example, by the control unit 71, whose activation in FIG. 7 is indicated by a blowing direction arrow oriented toward the conveying plane E19 of the suction belt feed table 19.

When the operating case representing a stoppage arises, in which a serious disruption occurs in a processing station, which is arranged downstream from the suction belt feed table 19 and configured, for example, as a coating device 22, of the machine system comprising the suction belt feed table 19, as a result of which the transfer of sheets to the transport device arranged downstream from the suction belt feed table 19 must be abruptly interrupted, the catching device 58 is switched into its catching position in that the drive 59 of the catching device 58 is automatically actuated, in particular in a program-controlled manner, by the control unit 71, in general by the control unit 71 controlling also other, and preferably all, functions of the suction belt feed table 19. This control unit 71 also controls, for example, the valves of the blower module 37 (FIG. 2). Simultaneously with the actuation of the catching device 58, the transport speed of the sheets, for example, can be decreased in that transport devices arranged upstream from the catching device 58 in the transport direction T of the sheets decrease their respective transport speed. Even if the transport speed of a transport device arranged upstream from the catching device 58 in the transport direction T of the sheets is not promptly decreased upon the actuation of the catching device 58, for example the transport speed of the ramp belts 48 and/or of the feed belt 54, in any case the vacuum pressure that is set in the relevant suction chamber 41 by means of a suction device 72 controlled by the control unit 71 is shut off, wherein this suction chamber 41 is connected, in terms of flow, to the relevant switching region 52 by means of the suction boreholes 53 formed in the conveying plane E19 of the suction belt feed table 19 and at least partially overlaps with an outline of the pile to be formed of the sheets to be caught. The at least one stop surface 66 of the catching device 58 is then injected into a sheet gap between the trailing edge of a predecessor sheet and a leading edge of a first follower sheet to be caught. For this purpose, the control unit 71 actuates at least one pneumatic switching valve 86, preferably two pneumatic switching valves 86; 87 simultaneously, so that the piston rod 61 of the pneumatic cylinder 81 forming the drive 59 of the catching device 58 is retracted.

In an advantageous embodiment, this pneumatic cylinder 81 comprises a base cap space 68 and a bearing cap space 69, which is separated from the base cap space 68 by a cylinder piston 82 that is fixedly connected to the piston rod 61, wherein a first pneumatic switching valve 86 is connected to the base cap space 68, and a second pneumatic switching valve 87 is connected to the bearing cap space 69. Each of these two switching valves 86; 87 is controlled by the control unit 71 of the catching device 58. In a first variant embodiment, the base cap space 68 can have barometric pressure. In another second variant embodiment, the base cap space 68 can have a pressure differential that is greater than the barometric pressure and smaller than the pressure in the bearing cap space 69. In a preferred embodiment, the piston rod 61 of the pneumatic cylinder 81 forming the drive 59 of the catching device 58 is retracted by applying a pressure of, for example, 7 bar to the bearing cap space 69. During this retraction of the piston rod 61 of the pneumatic cylinder 81, the cylinder piston 82 of the pneumatic cylinder works against compressed air pressurized to 2 bar, for example, in the base cap space 68, which can escape in a throttled manner via the opened pneumatic switching valve 86 of the base cap space 68, and possibly via an adjoining throttle valve 91. The decelerating action of this counterpressure does not start until a relatively late stage so that the movement of the cylinder piston 82, and thus also of the piston rod 61, initially experiences a very high acceleration with the resulting speed, before the movement of the cylinder piston 82 at its end is decelerated by the actively enclosed air column, and the residual speed is decelerated at an end-of-stroke damping element 83; 84 of the pneumatic cylinder 81. This very rapid movement of the cylinder piston 82 is highly multiplied by the crank 62 to the coupler 63 arranged in a centric slider crank position, preferably at a multiplication ratio i of at least 1:5 (i=0.2).

Using the described slider crank mechanism, it is possible to bring the at least one stop surface 66 of the catching device 58 into the catching position through a sheet gap that, for example, measures only approximately 20 mm, even at a high transport speed of the sheets of several thousand sheets per hour, for example of approximately 10,000 sheets per hour. The response time achievable by the proposed slider crank mechanism thus considerably exceeds the switching times of simple flap and/or sliding mechanisms that are driven, for example, by switchable magnets or directly, i.e., without a gear mechanism by a pneumatic cylinder 81. Another advantage of the identified solution is that the proposed slider crank mechanism has a comparatively simple and space-saving configuration.

This yields a machine system comprising several processing stations, each processing sheets, wherein these processing stations are arranged one behind the other in the transport direction T of the sheets, wherein at least one of these processing stations comprises a transport device 18 transporting the sheets lying flat along a linear transport section, wherein this transport device 18 is configured so as to transport individual sheets that directly follow one another in a sequence in each case spaced apart from one another by a gap, wherein a suction belt feed table 19 is arranged downstream from this transport device 18 transporting the sheets lying flat along a linear transport section, wherein the suction belt feed table 19 comprises a catching device 58 having a catching position, which is assumed as a result of an actuation, for individual sheets that follow one another in a sequence, wherein the catching device 58, in its catching position, catches sheets on the suction belt feed table 19 that are fed by the transport device 18, which transports the sheets lying flat along a linear transport section and is arranged upstream from the suction belt feed table 19, to the suction belt feed table 19 before they are transferred in each case to a transport device arranged downstream from the suction belt feed table 19 and stacks these. A control unit 71 provided for the suction belt feed table 19 actuates the catching device 58 as a function of a disruption that has occurred in a processing station arranged downstream from the suction belt feed table 19 in such a way that the catching device 58 assumes its catching position. In the preferred embodiment, the transport device 18, which is arranged upstream from the suction belt feed table 19 and transports the sheets lying flat along a linear transport section, forms part of a dryer 17. This dryer 17 is, for example, arranged downstream from a processing station configured as a non-impact printing unit 13. The suction belt feed table 19 is also preferably arranged upstream from a processing station configured as a coating device 22, in particular as a varnishing unit. The coating device 22 in particular comprises a transport cylinder 23, serving as the transport device for sheets to be transported, wherein a printing unit cylinder 24 including a forme roller 26 that is placed against, or at least can be placed against, this printing unit cylinder 24 preferably cooperates with this transport cylinder 23, wherein at least one squeegee 27 or a chamber doctor blade system 27 extends in the axial direction of the forme roller 26. This machine system is configured to transport the sheets at a transport speed of preferably several thousand sheets per hour, in particular approximately 10,000 sheets per hour. The transport device 18, which is arranged upstream from the suction belt feed table 19 and transports the sheets lying flat along a linear transport section, is configured so as to transport the individual sheets directly following one another in a sequence in each case with a sheet gap that preferably measures approximately 20 mm.

This yields a suction belt feed table 19 for sheet-format substrates to be individually transported lying flat, wherein the suction belt feed table 19 is arranged between a transport device arranged upstream in the transport direction T of the substrates and a transport device arranged accordingly downstream, wherein the suction belt feed table 19 comprises a catching device 58 having a catching position, which it assumes upon its actuation, for individual substrates following one another in a sequence, wherein the catching device 58, in its catching position, catches on the suction belt feed table 19 substrates that are fed to the suction belt feed table 19 from the upstream transport device before they are in each case transferred to the transport device arranged downstream from the suction belt feed table 19, i.e., prevents movement progress that is oriented in the transport direction T, and preferably stacks them. The transport device arranged upstream from the suction belt feed table 19 includes a translatory transport section for the sheet-format substrates to be individually transported lying flat, and/or the transport device arranged downstream from the suction belt feed table 19 includes a rotatory transport section or a translatory transport section for the sheet-format substrates to be transported. An in particular digital control unit 71 is provided, wherein this control unit 71 actuates the catching device 58 as a function of a disruption that has occurred along the transport section forming part of the transport device arranged downstream from the suction belt feed table 19 in such a way that the catching device 58 assumes its catching position. The catching device 58 comprises at least one pivotable stop surface 66 for substrates to be caught, wherein the relevant stop surface 66, in a state in which the catching device 58 has not been actuated by the control unit 71, is arranged beneath a conveying plane E19 of the suction belt feed table 19 and, in a state in which the catching device 58 has been actuated by the control unit 71, is pivoted through an opening 67 in the conveying plane E19 of the suction belt feed table 19 and placed upright perpendicular to this conveying plane E19, so that substrates transported on the suction belt feed table 19 strike against the at least one upright stop surface 66 protruding from the conveying plane E19 of the suction belt feed table 19.

In its preferred embodiment, the catching device 58 comprises a slider crank mechanism, wherein the slider crank mechanism comprises a coupler 63 and a crank 62 cooperating with the coupler 63, with the crank 62 being driven by a drive 59. The crank 62 is rotatably mounted in a pivot point D62 that is arranged stationary in the suction belt feed table 19, wherein the crank 62 is configured as an elbow lever and comprises a short lever and a lever that is longer compared to this short lever, wherein the short lever connects a fulcrum G61, at which the drive 59 engages on the crank 62, to the pivot point D62 of the crank 62, and wherein the longer lever of the crank 62 extends between its pivot point D62 and a fulcrum G62 at which the crank 62 is connected to the coupler 63. The short lever and the longer lever of the crank 62 are embodied such with respect to one another in terms of their length ratio that they multiply a movement acting by the drive 59 of the catching device 58 on the coupler 63. The multiplication ratio i is preferably at least 1:5. An end point E2 of the coupler 63 which faces away from the drive 59 of the catching device 58 can be moved in a bidirectional linear manner along a path 64 arranged parallel to the conveying plane E19 of the suction belt feed table 19, wherein the end point E2 of the coupler 63 which faces away from the drive 59 of the catching device 58 and the pivot point D62 of the crank 62 are located on a straight line G64 connecting these two points to one another, with this straight line G64 running parallel to the conveying plane E19 of the suction belt feed table 19. The at least one stop surface 66 for substrates to be caught is formed in a region between an end point E1 of the coupler 63 which faces the drive 59 of the catching device 58 and the fulcrum G62, at which the crank 62 is connected to the coupler 63. The slider crank mechanism preferably comprises a centric slider crank, in which the three sections G62-D62; G62-E2 and G62-E1 each have the same length, and the end points E1; E2 of the coupler 63, including the fulcrum G62 situated therebetween, are all located on a straight line connecting the end points E1; E2 of the coupler 63 to one another. The drive 59 of the catching device 58 is advantageously configured as a double-acting pneumatic cylinder 81, wherein this pneumatic cylinder 81 comprises a base cap space 68 and a bearing cap space 69, which is separated from the base cap space 68 by a cylinder piston 82 that is fixedly connected to its piston rod 61. The bearing cap space 69 is arranged at the end of the pneumatic cylinder 81 which faces the fulcrum G61 at which the drive 59 engages on the crank 62. The base cap space 68 is arranged at the end of the pneumatic cylinder 81 which faces away from the fulcrum G61 at which the drive 59 engages on the crank 62. A first pneumatic switching valve 86 is connected to the base cap space 68, and a second pneumatic switching valve 87 is connected to the bearing cap space 69, wherein each of these two switching valves 86; 87 is controlled by the control unit 71 of the catching device 58. The base cap space 68 has either barometric pressure, or the base cap space 68 has a pressure differential that is greater than the barometric pressure and smaller than the pressure in the bearing cap space 69. The piston rod 61 of the pneumatic cylinder 81 is retracted by applying a pressure of, for example, 7 bar to the bearing cap space 69. During the retraction of the piston rod 61 of the pneumatic cylinder 81, the cylinder piston 82 of the pneumatic cylinder 81 works against compressed air pressurized to 2 bar, for example, in the base cap space 68, wherein this compressed air is provided from a compressed air source 93 connected to the base cap space 68.

In addition, a suction belt feed table 19 for transporting individual sheet-format substrates lying flat in a conveying plane E19 is yielded, wherein the suction belt feed table 19 comprises a catching device 58 as well as at least one ramp belt 48, wherein the catching device 58 and the at least one ramp belt 48 are configured, in each case controlled by a control unit 71, to selectively assume one of two different operating states, wherein the first operating state is an inactive operating state and the second operating state is an activated operating state, in each case with reference to the catching device 58 and the at least one ramp belt 48, wherein the catching device 58 in its activated state has at least one stop surface 66 for substrates to be caught that is placed upright, perpendicular to the conveying plane E19 of the suction belt feed table 19, wherein the at least one ramp belt 48 is arranged, in the transport direction T of the substrates, at least one substrate length, extending in the transport direction T of the substrates, ahead of the stop surface 66 that is placed upright, perpendicular to the conveying plane E19 of the suction belt feed table 19, and wherein at least one ramp belt 48 in its activated state is pivoted, with its end that is oriented in the transport direction T of the substrates, obliquely upwardly at an acute angle, opening in the transport direction T of the substrates, and out of the conveying plane E19 of the suction belt feed table 19. The suction belt feed table 19 is arranged between a transport device arranged upstream in the transport direction T of the substrates and a transport device arranged accordingly downstream, wherein the transport device arranged upstream from the suction belt feed table 19 includes a translatory transport section for the sheet-format substrates to be individually transported lying flat, and/or the transport device arranged downstream from the suction belt feed table 19 includes a rotatory transport section or a translatory transport section for the sheet-format substrates to be transported. Advantageously, a catch blower 51 including several blower nozzles that are arranged in a row extending transversely to the transport direction T of the substrates is arranged in a region above the conveying plane E19 of the suction belt feed table 19, which extends in the transport direction T of the substrates between the upright stop surface 66 of the catching device 58 and the at least one ramp belt 48 that is pivoted obliquely upwardly at an acute angle and out of the conveying plane E19 of the suction belt feed table 19, wherein the catch blower 51 in its activated state blows blower air from its blower nozzles, for example perpendicularly in the direction of the conveying plane E19 of the suction belt feed table 19. The control unit 71 actuates the catching device 58 as a function of a disruption that has occurred along the transport section forming part of the transport device arranged downstream from the suction belt feed table 19 in such a way that the catching device 58 places its at least one stop surface 66 for substrates to be caught upright, perpendicular to the conveying plane E19 of the suction belt feed table 19, and/or this control unit 71 actuates the at least one ramp belt 48 as a function of the disruption that has occurred along the transport section forming part of the transport device arranged downstream from the suction belt feed table 19 in such a way that the at least one ramp belt 48 is pivoted obliquely upwardly at the acute angle and out of the conveying plane E19 of the suction belt feed table 19, and/or this control unit 71 actuates the catch blower 51 as a function of the disruption that has occurred along the transport section forming part of the transport device arranged downstream from the suction belt feed table 19 in such a way that the catch blower 51 blows blower air from its blower nozzles in the direction of the conveying plane E19 of the suction belt feed table 19. The suction belt feed table 19 preferably configured in such a way that a blower module 37 of a shingling device that forms part of the suction belt feed table 19 is arranged downstream from the catching device 58, in the transport direction T of the substrates, above the conveying plane E19 of the suction belt feed table 19. In addition, for example, a guide device 42, which extends transversely to the transport direction T of the substrates and has several lifting nozzles 43, is arranged upstream from the at least one ramp belt 48, in the transport direction T of the substrates, at the transition from the transport device arranged upstream from the suction belt feed table 19 to this suction belt feed table 19. Additionally, for example, at least one suction chamber 41 is arranged in the region beneath the conveying plane E19 of the suction belt feed table 19, which extends in the transport direction T of the substrates between the upright at least one stop surface 66 of the catching device 58 and the at least one ramp belt 48 that is pivoted obliquely upwardly at the acute angle and out of the conveying plane E19 of the suction belt feed table 19, wherein the relevant suction chamber 41 is adjusted, or can be adjusted, in terms of its respective pressure by the control unit 71, and wherein a vacuum pressure is adjusted, or at least can be adjusted, in the conveying plane E19 of the suction belt feed table 19 by the control unit 71 by way of suction boreholes 53 to the relevant suction chamber 41 which are formed in the conveying plane E19 of the suction belt feed table 19. The vacuum pressure set in the conveying plane E19 of the suction belt feed table 19 by means of the suction chamber 41 is shut off in the event that a disruption has occurred along the transport section forming part of the transport device arranged downstream from the suction belt feed table 19. The control unit 71 is preferably configured so as to decrease a transport speed of the substrates, at least in the transport device arranged upstream from the catching device 58 in the transport direction T of the substrates. Preferably, two ramp belts 48, which are arranged parallel to one another in the form of respective revolving continuous belts are in each case provided in the transport direction T of the sheets, wherein these two ramp belts 48 are arranged symmetrically with respect to the center line M of the conveying plane E19 of the suction belt feed table 19.

Hereafter, it is assumed that a pneumatic drive 59 controlled by the control unit 71 actuates the catching device 58. As was already illustrated, it is necessary in the event of a stoppage due to the high transport speed of several thousand sheets per hour, for example approximately 10,000 sheets per hour, transported in the conveying plane E19 of the suction belt feed table 19, and the relative small gap of, for example, only approximately 20 mm between individual sheets directly following one another in their transport direction T, to place the at least one stop surface 66 of the catching device 58 upright in a very short time in the conveying plane E19 of the suction belt feed table 19, and to thereby inject it into the linear transport section of the sheets, so that a transfer of further sheets that are fed to the suction belt feed table 19, after the at least one stop surface 66 of the catching device 58 has been placed upright, to a curved, in particular circular arc-shaped transport section of a transport device arranged downstream from the suction belt feed table 19 is effectively prevented. At these short switching times, a cylinder piston 82 in a pneumatic cylinder 81, due to the kinetic energy that is achieved, exerts such a high force pulse on the inner stops of this pneumatic cylinder 81 that these stops are worn in a very short time, and thus destroyed. A need therefore exists for a solution that provides enhanced damping at the inner stops of the pneumatic cylinder 81, so that this pneumatic cylinder 81, during the described use, has sufficient wear resistance, and thus the longest possible service life.

As is apparent from FIG. 8, it is therefore proposed to provide a pneumatic circuit for the operation of the double-acting pneumatic cylinder 81 of the catching device 58, which controls the movement of the cylinder piston 82 in such a way that a positive acceleration is set for the cylinder piston 82 during a first half of its stroke, and a negative acceleration is set during a second half of its stroke following the first half. This pneumatic cylinder 81 comprises a base cap space 68 and a bearing cap space 69 that is separated from the base cap space 68 by the cylinder piston 82, wherein the cylinder piston 82 is fixedly connected to the piston rod 61. The bearing cap space 69 is arranged at the end of the pneumatic cylinder 81 which faces the fulcrum G61 at which the drive 59 engages on the crank 62. The base cap space 68 is arranged at the end of the pneumatic cylinder 81 which faces away from the fulcrum G61 at which the drive 59 engages on the crank 62. The cylinder piston 82 preferably comprises a respective end-of-stroke damping element 83; 84 on each side. The pneumatic circuit described in detail hereafter implements a controlled acceleration phase and a controlled deceleration phase over the entire stroke of the cylinder piston 82 as a result of a change in a dynamic pressure equilibrium in the two chambers 68; 69 of the pneumatic cylinder 81.

The pneumatic circuit comprises a first pneumatic switching valve 86 and a second pneumatic switching valve 87, wherein each of the two valves 86; 87 is preferably electrically actuated by the control unit 71. Each of the two switching valves 86; 87 is connected to its respective compressed air source 93 in one of their switched positions. FIG. 8 shows the operating position of the pneumatic cylinder 81 in which the piston rod 61 of the pneumatic cylinder 81 forming the drive 59 of the catching device 58 is retracted, and thus the catching device 58 is activated, which means that the stop surface 66 of the catching device 58 is placed upright in the conveying plane E19 of the suction belt feed table 19. A pressure regulator 88 is preferably connected upstream from at least the switching valve 86 for the base cap space 68, so as to build up a defined initial counterpressure in the base cap space 68 when the compressed air flows out. However, a pressure regulator 89 can also be connected upstream from the switching valve 87 for the bearing cap space 69. In addition, a throttle valve 91 is arranged downstream from the switching valve 86 of the base cap space 68 so as to influence, by way of this throttle valve 91, which preferably has an adjustable cross-section, the speed with which the compressed air flows out of the base cap space 68, and thus the dynamic pressure curve in the pneumatic cylinder 81, and consequently the speed of the cylinder piston 82. It may also be provided, for example, that a throttle valve 92 is arranged in the air discharge from the bearing cap space 69 of the pneumatic cylinder 81 so as to restrict the speed of the cylinder piston 82. The throttle valve 91 of the base cap space 68 and possibly the throttle valve 92 of the bearing cap space 69 are only utilized when compressed air flows out of the particular chamber 68; 69 into the atmosphere.

Before the catching device 58 is activated, the bearing cap space 69 of the pneumatic cylinder 81 is preferably depressurized, i.e., the prevailing pressure therein is, for example, equal to the barometric pressure. However, in an alternative embodiment it may also be provided that a pressure that is greater than the barometric pressure, for example a pressure that corresponds to the pressure in the base cap space 68, i.e., preferably a pressure of, for example, 2 bar, is applied to the bearing cap space 69 of the pneumatic cylinder 81 via the pressure regulator 89 that is possibly connected thereto. When the pressure that is set in the two chambers 68; 69 is the same, the cylinder piston 82 is held in a stable end position. An air mass that can be controlled by way of the pressure and is required for decelerating the displacement movement of the cylinder piston 82, which occurs when the catching device 58 is activated, is provided in the base cap space 68, which has been pressurized with compressed air to, for example, 2 bar. The activation of the catching device 58 when its at least one stop surface 66 is injected into a sheet gap between the trailing edge of a predecessor sheet and the leading edge of a first follower sheet to be caught is achieved in that the two switching valves 86; 87 are actuated, in particular simultaneously, by the control unit 71. As a result, the bearing cap space 69 is filled by its compressed air source 93 with compressed air of more than 5 bar, in particular with a pressure of, for example, 7 bar, and the air in the base cap space 68 which is pressurized to approximately 2 bar can now escape into the atmosphere in a manner that is controlled via the throttle valve 91, whereby a pressure differential of approximately 5 bar and thus a corresponding force arises at the cylinder piston 82 after a very short time, which causes this cylinder piston 82 to move. Controllable via the air mass that is trapped in the bearing cap space 69 and via the opening cross-section of the throttle valve 91, the deceleration action takes effect in such a way that the movement of the cylinder piston 82 at first experiences a very high acceleration with the resulting speed, before this movement of the cylinder piston 82 at the end is substantially decelerated by the actively enclosed air column, and only a remaining residual speed of less than, for example, 10% of the previously achieved maximum possible speed is decelerated at the end-of-stroke damping element 83 of the pneumatic cylinder 81. Upon an activation of the catching device 58, the cylinder piston 82 is accelerated over the first half of its stroke, and is decelerated over its second half. During the first half of its stroke, the cylinder piston 82 reaches its maximum possible speed. In the theoretical ideal case, the cylinder piston 82 arrives in its respective end position at the speed of zero. During real operation, however, this is not achieved. For this reason, the low residual energy that is still present has to be dissipated at the particular end-of-stroke damping element 83; 84. This very rapid movement of the cylinder piston 82 is transferred from the crank 62 to the coupler 63, which is arranged in a preferably centric slider crank position, with high multiplication.

As a result of the described pneumatic circuit and the settings for the pressure mentioned by way of example, it is possible to bring the at least one stop surface 66 of the catching device 58 into a catching position through the aforementioned very narrow sheet gap, even at the aforementioned high transport speed of the sheets. Advantageously, the identified solution allows high impact stresses and load peaks to be avoided in the entire kinematic system. The reason is that the enclosed air column damping the driving movement of the cylinder piston 82 at the end, in particular in the base cap space 68, effectively prevents a destruction of the cylinder base. Moreover, a secure end position of the cylinder piston 82 in its retracted state is achieved without additional mechanical elements, and thus without additional costs. By reducing the pressure in the bearing cap space 69, additional energy savings and a reduction of potential leakage are achieved.

Figure 9:
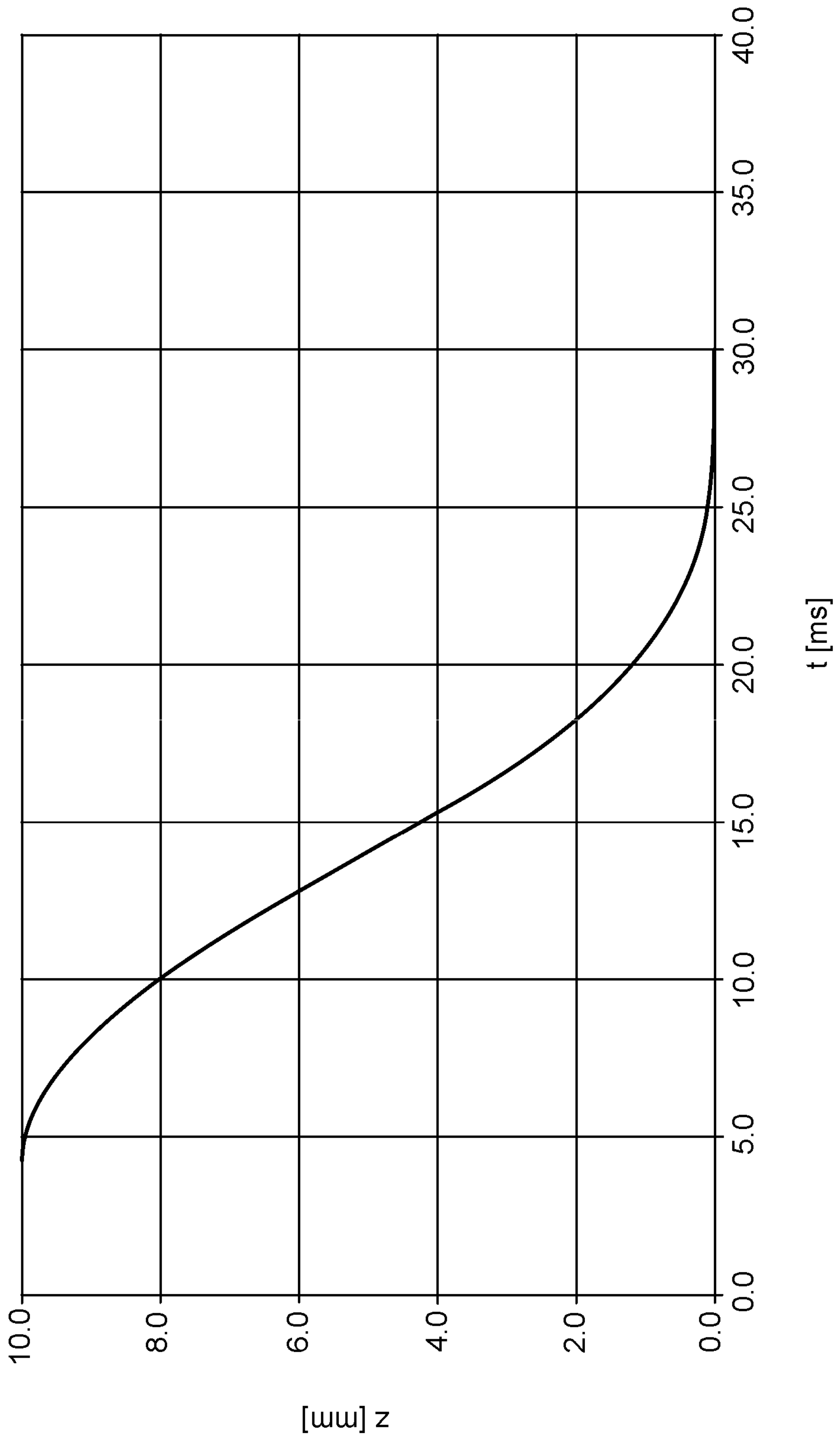
FIG. 9 a graph regarding the stroke of the cylinder piston of a pneumatic cylinder driving the catching device.
Figure 10:
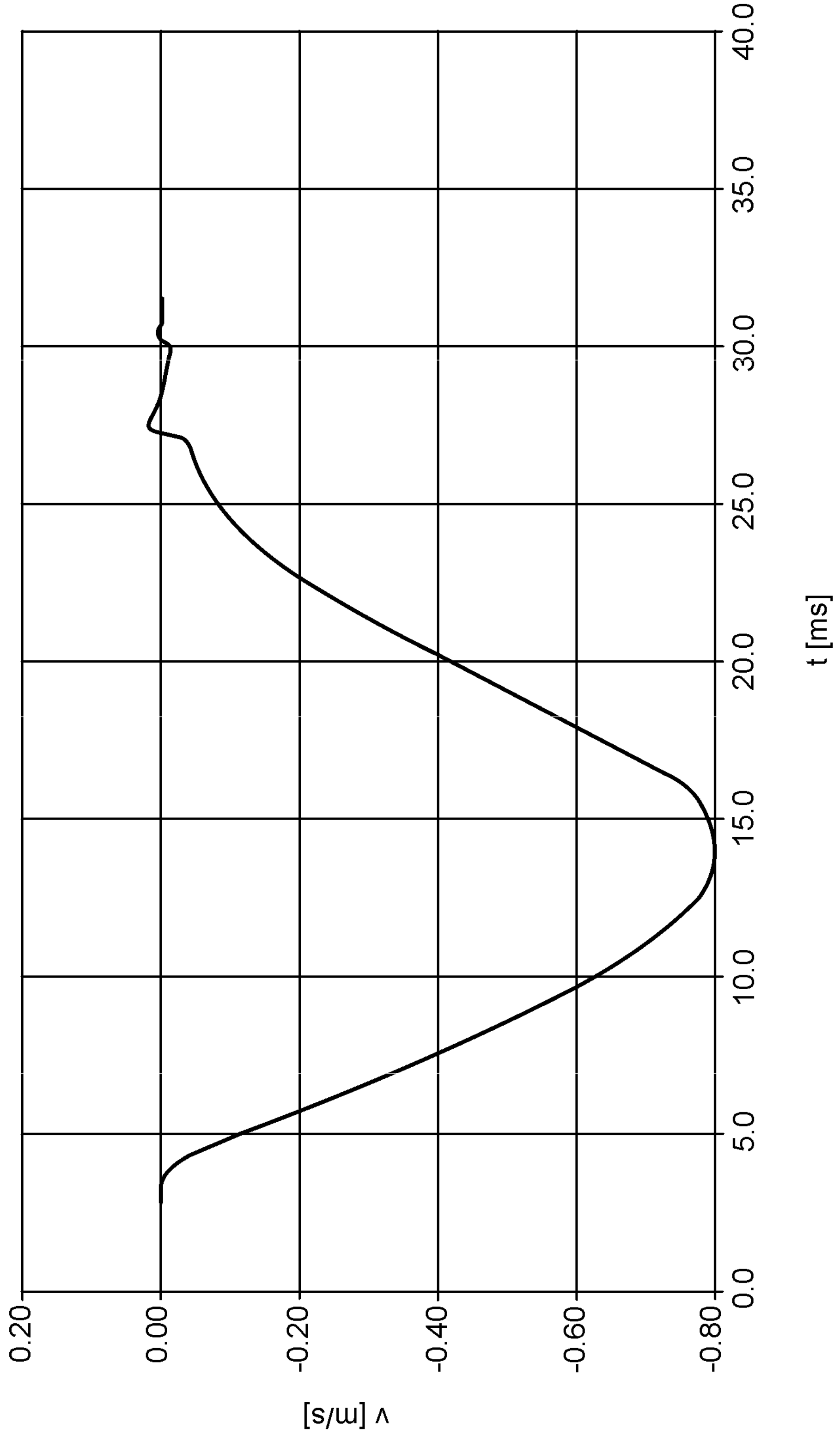
FIG. 10 a graph regarding the speed of the cylinder piston during operation of the catching device.
Figure 11:
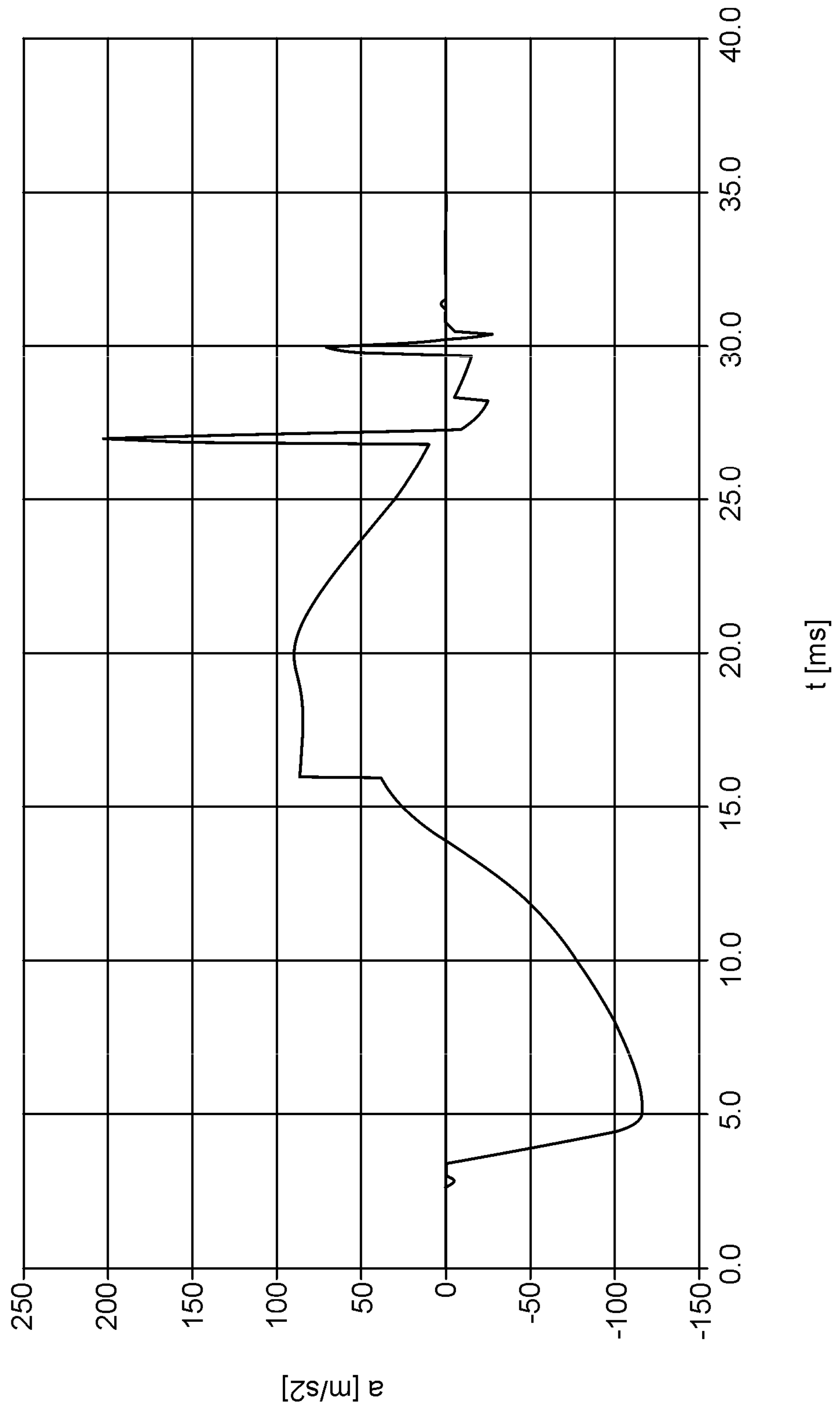
FIG. 11 a graph regarding the acceleration of the cylinder piston during operation of the catching device.
Figure 12:
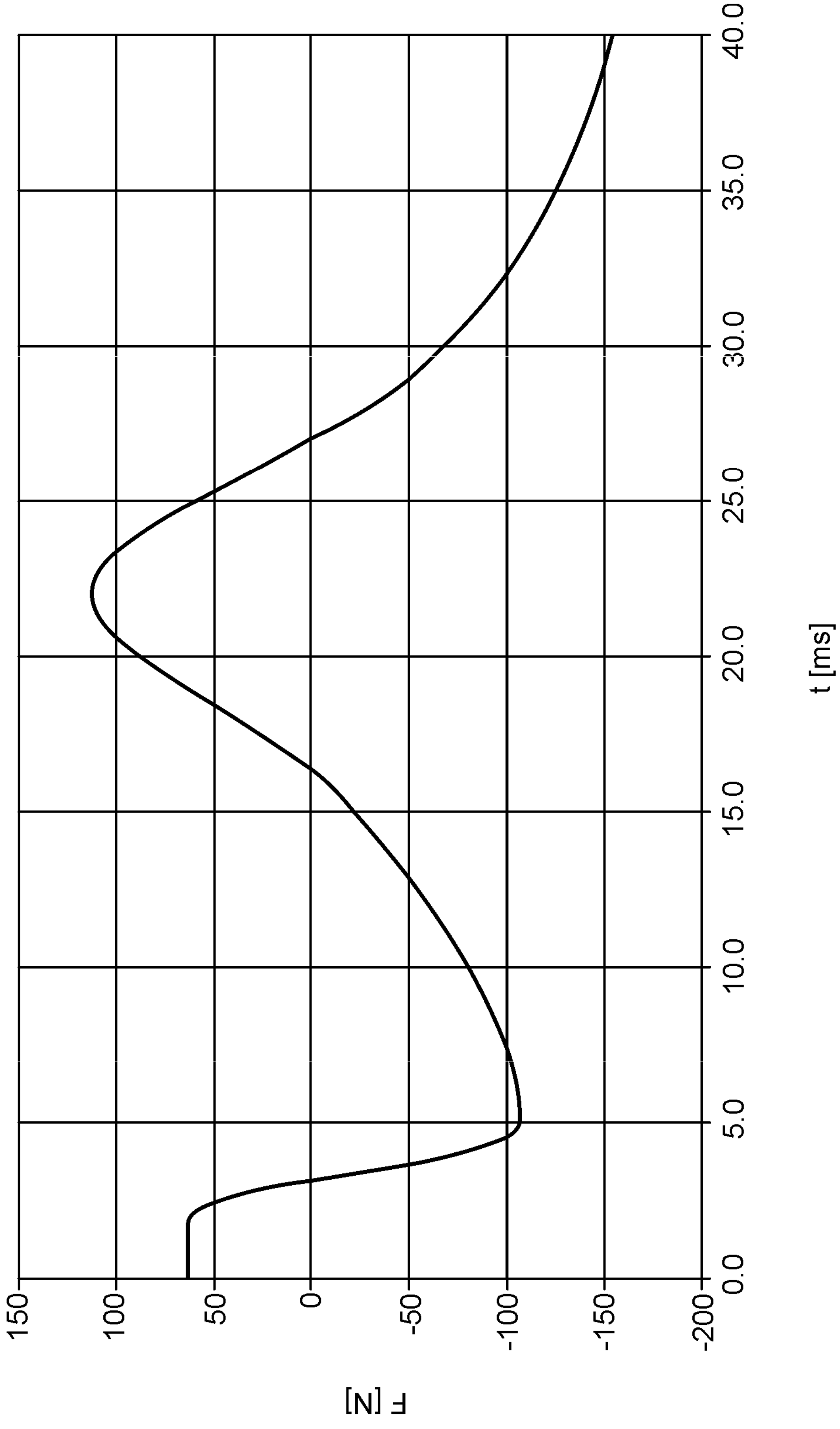
FIG. 12 a graph regarding the progression of the piston force of the cylinder piston during operation of the catching device.

FIGS. 9 to 12 in respective graphs again illustrate by way of example the dynamic behavior, over the time t plotted on the abscissa, of several physical quantities with respect to the cylinder piston 82 of the pneumatic cylinder 81 during a switching process, when the catching device 58 of the relevant suction belt feed table 19, in particular actuated by a control signal of the control unit 71, is moved from its starting position into its catching position. FIG. 9 shows a change in position of the cylinder piston 82 between its two end positions in the pneumatic cylinder 81. A travel distance z and thus the stroke of the cylinder piston 82 is shown here to be 10 mm, for example. FIG. 10 by way of example shows the speed v of the cylinder piston 82 during its movement along the travel distance z. FIG. 11 by way of example shows the associated acceleration a, with which the cylinder piston 82 carries out its movement along the travel distance z. FIG. 12 also shows the piston force F exerted by the cylinder piston 82 by way of example.

As described, this yields a suction belt feed table 19 for transporting individual sheet-format substrates lying flat in a conveying plane E19, wherein the suction belt feed table 19 comprises a catching device 58 that has at least one stop surface 66 for substrates to be caught, which in its catching position is placed upright in the conveying plane E19 of the suction belt feed table 19, wherein this at least one stop surface 66, proceeding from an inactive starting position of the catching device 58, is placed upright into the catching position by a double-acting pneumatic cylinder 81 by way of a movement of its cylinder piston 82, wherein this pneumatic cylinder 81 comprises a base cap space 68 and a bearing cap space 69, which is separated from the base cap space 68 by the cylinder piston 82, wherein a pneumatic circuit is provided for controlling the movement of the cylinder piston 82, wherein the pneumatic circuit comprises a first pneumatic switching valve 86 connected to the base cap space 68, and a second pneumatic switching valve 87 connected to the bearing cap space 69, with each of the two switching valves 86; 87 preferably being electrically actuated by the control unit 71. The catching device 58 comprises a slider crank mechanism according to the above description, which is driven by the cylinder piston 82 of the pneumatic cylinder 81. The movement of the cylinder piston 82 is controlled by the control unit 71 in such a way that a positive acceleration is set for the cylinder piston 82 during a first half of its stroke, and a negative acceleration is set during a second half of its stroke following the first half. A pressure regulator 88 is connected upstream from at least the first switching valve 86 connected to the base cap space 68. In addition, for example a throttle valve 91, which preferably has an adjustable opening cross-section, is arranged downstream from at least the first switching valve 86 connected to the base cap space 68. The opening cross-section of the throttle valve 91 is adjusted, for example, by the control unit 71 in such a way that the movement of the cylinder piston 82 at the end of the second half of its stroke has a residual speed of less than 10% of the maximum speed previously achieved during the first half of its stroke. The cylinder piston 82 preferably comprises a respective end-of-stroke damping element 83; 84 at the two sides, wherein the residual speed of the cylinder piston 82 at the end of the second half of its stroke is decelerated at the relevant end-of-stroke damping element 83; 84. In the inactive starting position of the catching device 58, a pressure that is greater than the barometric pressure, preferably a pressure of, for example, 2 bar, is applied at least to the base cap space 68 of the pneumatic cylinder 81. So as to adjust the catching position of the catching device 58, the control unit 71 switches the first switching valve 86 connected to the base cap space 68 into a position in which the air mass is discharged from the base cap space 68, while switching the second switching valve 87 connected to the bearing cap space 69 such that compressed air having a pressure of more than 5 bar is supplied to the bearing cap space 69.

In connection with FIG. 2, it was described that the suction belt feed table 19, in its conveying plane E19, has a switching region 52 that extends in the transport direction T of the sheets and has several suction boreholes 53, wherein preferably several suction chambers 41 that can be controlled in terms of their respective flow action are arranged beneath the conveying plane E19 of the suction belt feed table 19. These suction chambers 41 are preferably arranged one behind the other in the transport direction T of the sheets and are switched, or at least can be switched, in terms of their respective pressure, in particular individually and independently of one another. It was also explained that the suction boreholes 53 in the switching region 52 form a flow connection to at least one of the preferably several suction chambers 41, which are each arranged beneath the conveying plane E19 of the suction belt feed table 19, wherein a vacuum pressure is adjusted, or at least can be adjusted, at the suction boreholes 53 in the conveying plane E19 of the suction belt feed table 19 in this switching region 52, by the respective adjustment of the pressure in the relevant suction chamber 41 by means of a suction device 72 controlled by the control unit 71. This vacuum pressure causes a sheet resting on the at least one feed belt 54 in the conveying plane E19 of the suction belt feed table 19 to be held in a frictionally engaged or force-fit manner. This is due to the fact that the switching region 52 at least partially overlaps with the outline of the sheet to be caught. The relevant feed belt 54 is, for example, configured as a continuously revolving suction belt, wherein a suction belt has a perforation at least in sections so that the vacuum pressure adjusted at the suction boreholes 53 in the conveying plane E19 of the suction belt feed table 19 can take effect through the relevant feed belt 54 on the sheet resting thereon. The feed belt 54 is preferably configured as a flat belt.

If the operating case of a stoppage occurs and the at least one stop surface 66 of the catching device 58 is moved into its catching position, the frictional engagement or force fit between the respective feed belt 54 and the sheet resting thereon must be canceled in a very short time since otherwise the sheet resting on the relevant feed belt 54, during its impact with the at least one stop surface 66 of the catching device 58 protruding from the conveying plane E19 of the suction belt feed table 19, would be pushed together, i.e., crumpled. The reason is that, at a transport speed of several thousand sheets per hour, for example of approximately 10,000 sheets per hour, it is neither possible to cancel, in the relevant suction chamber 41, the vacuum pressure that is adjusted there by means of the suction device 72 controlled by the control unit 71, and with this the retaining force acting on the sheet resting on the respective feed belt 54, within the short time that is required to do so, nor to stop the relevant feed belt 54 per se in time before the relevant sheet strikes against the at least one stop surface 66 of the catching device 58. So as to avoid damage to a sheet that rests on the particular feed belt 54 and is the first to strike against the stop surface 66 of the catching device 58 protruding from the conveying plane E19 of the suction belt feed table 19 when a stoppage occurs during operation, a need therefore exists to cancel the aforementioned frictional engagement or force fit more quickly compared to shutting off the suction device 72 of the relevant suction chamber 41 and/or compared to stopping the relevant feed belt 54.

Figure 13:
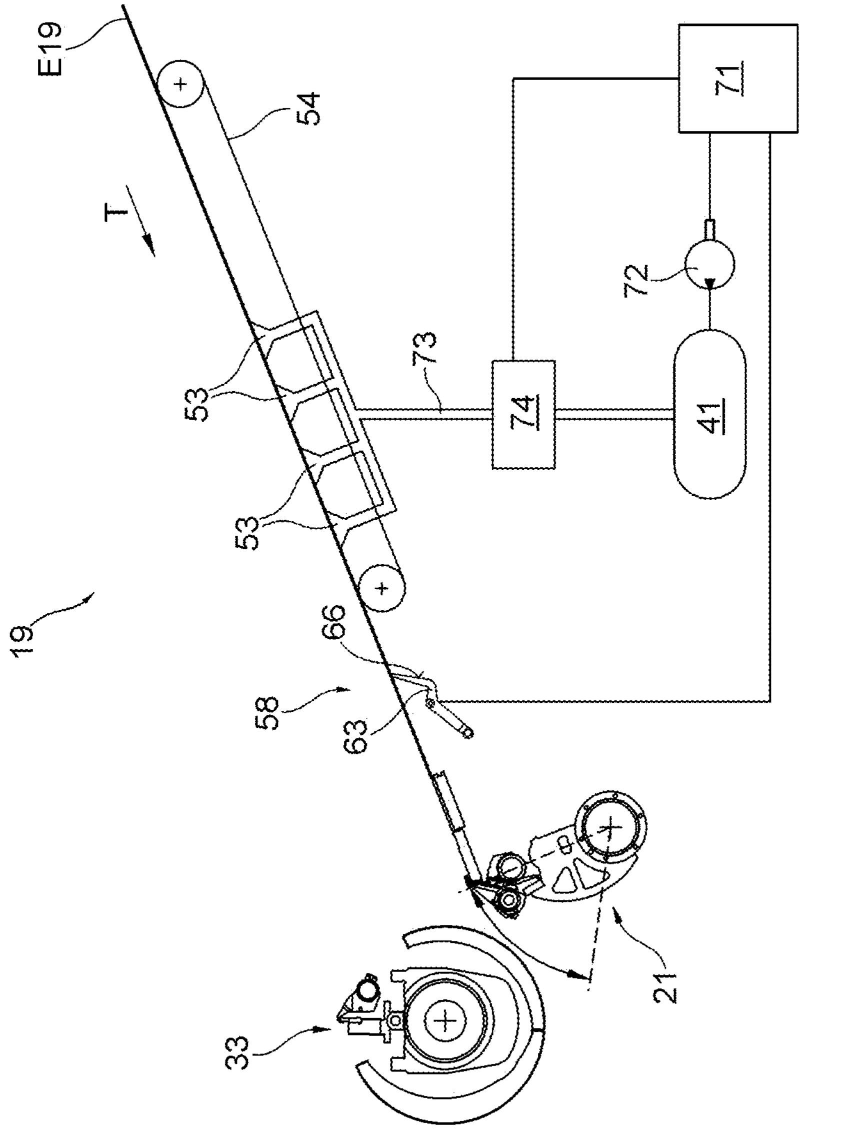
FIG. 13 a schematic illustration of a circuit for suspending a frictional engagement or force fit of sheets held on the suction belt feed table.

As is apparent from FIG. 13, it is therefore proposed that at least one pneumatic cycle valve 74, which is controlled by a control unit 71, is arranged in a feed line 73 that pneumatically connects the relevant suction chamber 41 to the respective suction boreholes 53, wherein the relevant cycle valve 74 interrupts the pneumatic connection when the catching device 58 is moved into its catching position. In a preferred embodiment, the relevant cycle valve 74 is configured in such a way that a section of the feed line 73 between the relevant cycle valve 74 and the respective suction boreholes 53 is ventilated with barometric pressure, or with a pressure that is higher by 3% to 10%, preferably by 5% compared to the barometric pressure, at the same time as the pneumatic connection between the relevant suction chamber 41 and the respective suction boreholes 53 is interrupted. The transport speed of the sheets corresponds to a cycle time during which sheets directly following one another reach the position of the at least one stop surface 66 of the catching device 58 protruding from the conveying plane E19 of the suction belt feed table 19. A switching time of the relevant cycle valve 74 is designed to be shorter than the cycle time of sheets that directly follow one another and preferably ranges between 20 ms and 100 ms, in particular is 40 ms. The switching time of the relevant cycle valve 74 is the time from the point in time of its actuation until the point in time at which the relevant cycle valve 74, proceeding from its first operating position, has stably switched into its second operating position. The control unit 71 is preferably configured so as to bring, by a duration of one cycle time prior to the actuation of the catching device 58, the relevant cycle valve 74 into the state in which it interrupts the pneumatic connection between the relevant suction chamber 41 and the respective suction boreholes 53.

The advantage of this identified solution is that, in the event of a stoppage, even the first sheet caught by the catching device 58 is not pushed together or crumpled. Rather, by arranging at least one of the cycle valves 74 controlled by the control unit 71 in the feed line 73 between the relevant suction chamber 41 and the respective suction boreholes 53, it is achieved that the process of catching a sheet is independent of the at least one feed belt 54 inevitably continuing to run after the stoppage has been detected and/or of a continued suctioning action of the relevant suction chamber 41.

As was already explained in connection with FIGS. 1 to 3, several sheets are fed to the suction belt feed table 19 from a transport device arranged directly upstream from the suction belt feed table 19, wherein these sheets are transported individually, lying flat, in each case with a small gap with respect to one another, one behind the other along a linear transport section, at least in this transport device and on the suction belt feed table 19. In the preferred embodiment, these sheets are transported by means of several conveyor belts arranged one behind the other in the transport direction T of the sheets, starting with the revolving conveyor belt 18 of the transport device arranged directly upstream from the suction belt feed table 19, via at least one receiving belt 44, which forms part of the suction belt feed table 19 and, for example, is configured as a revolving flat belt that is preferably arranged in the center region of the conveying plane E19 of the suction belt feed table 19, wherein, for example, two ramp belts 48, which are arranged parallel to one another, for example in the form of respective revolving continuous belts, are arranged downstream from the receiving belt 44 in the transport direction T of the sheets, followed by at least one feed belt 54, which is in particular configured as a suction belt, and, for example, two braking belts 56, which are arranged parallel to one another and are each configured as a revolving continuous belt. During each transition from a revolving continuous belt—for example, during a transition between two consecutive machine units, such as from a non-impact printing unit 13 or from a dryer 17 or from a suction belt feed table 19, to a respective other machine unit, with at least one of these machine units comprising at least one transport device in the form of a revolving continuous belt—to a transport device following the relevant conveyor belt in the transport direction T of the sheets, a discontinuity point 78, in terms of the mechanical support of the sheets to be transported, exists in the conveying plane E19 of the sheets due to a gap, which is present in this conveying plane E19 with respect to a rotating diverting roller 76 of the relevant conveyor belt and has a large width, compared to the thickness of the sheets, in the range, for example, between 1 mm and 5 mm, wherein this discontinuity point 78 has the inherent risk of disrupting the operation, especially at a high transport speed of several thousand sheets per hour, for example of approximately 10,000 sheets per hour. The reason is that, when sheets that rest on a revolving belt are transported, there is a risk that the leading edge of the relevant sheet, at the end of the transport section defined by the relevant conveyor belt, due to its adhesion to the relevant conveyor belt diverted there at the end by means of the diverting roller 76, is diverted into the relevant discontinuity point 78, whereby such a sheet is impeded from being transported further and itself becomes an obstacle to succeeding sheets. This problem exists in particular at all transitions when at least one of the conveyor belts acting at the relevant transition has a width, extending transversely to the transport direction T of the sheets, that is at least 25% of the width of the sheets to be transported. This is, for example, also the case in the preferred embodiment at the transition from the transport device, which is arranged directly upstream from the suction belt feed table 19 and, for example, forms part of a dryer 17, to this suction belt feed table 19.

It is therefore proposed to replace the discontinuity point 78 of the mechanical support of the sheets to be transported in the conveying plane E19 with a pneumatic pressure force. This is achieved in that a guide device 42, which extends transversely to the transport direction T of the sheets and preferably has several lifting nozzles 43 arranged in at least one row, is arranged at the transition from the transport device arranged, for example, directly upstream from the suction belt feed table 19 to this suction belt feed table 19. This guide device 42, with its several lifting nozzles 43, is in particular arranged upstream from the at least one ramp belt 48, in the transport direction T of the sheets, at the transition from the transport device arranged upstream from the suction belt feed table 19 to this suction belt feed table 19. In an advantageous embodiment, the diverting roller 76 arranged at the discontinuity point 78 has, on its outer cylindrical surface, for example, several nozzle-shaped openings, wherein a compressed air jet exits from each of these openings, with one of the compressed air jets being oriented at least in the direction of the at least one lifting nozzle 43.

Figure 14:
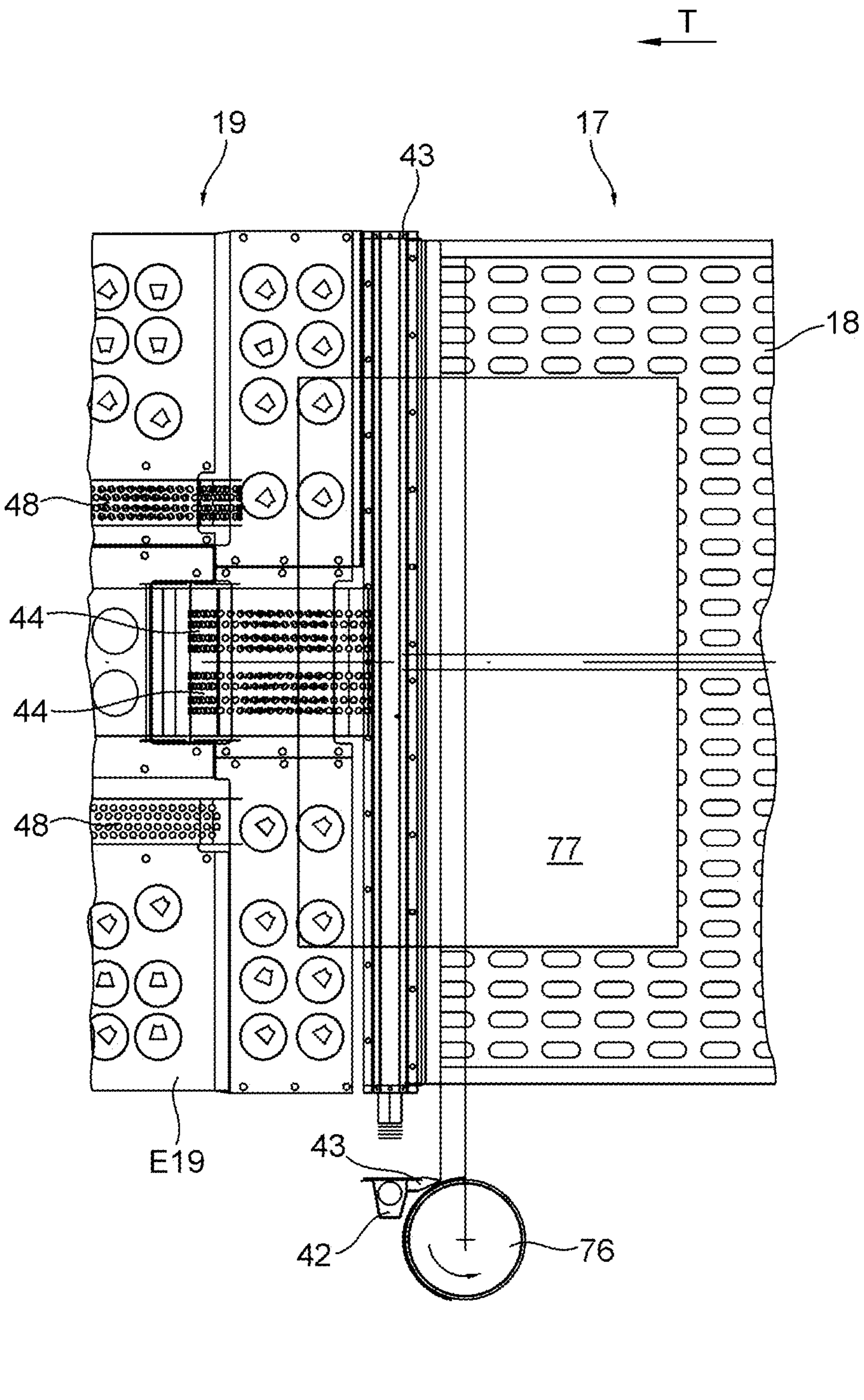
FIG. 14 a detail from the suction belt feed table shown in a top view in FIG. 3.

FIG. 14 by way of example shows a top view of a detail from the suction belt feed table 19 described, for example, in connection with FIG. 3. A sheet-format substrate, preferably a printing sheet, sheet 77 for short, is transferred, as a result of its translatory movement, to the suction belt feed table 19 while lying flat on a revolving conveyor belt 18 that is part, for example, of a dryer 17, in a conveying plane E19. Beneath the conveying plane E19 of the suction belt feed table 19, and preferably ending flush with this conveying plane E19 toward the top, a rotating diverting roller 76 is arranged, which moves the conveyor belt 18 in the transport direction T of the sheets 77 and diverts it at the end of the transport device arranged directly upstream from the suction belt feed table 19. At their transition from the transport device that is arranged directly upstream from the suction belt feed table 19 to the suction belt feed table 19, the sheets 77 have to overcome a discontinuity point 78 in their mechanical support which is located in the conveying plane E19. Transferred sheets 77 are, for example, grasped by a receiving belt 44 that forms part of the suction belt feed table 19, wherein this receiving belt 44 is, for example, configured as a revolving flat belt arranged in the center region of the conveying plane E19 of the suction belt feed table 19 and/or as a suction belt. In the transport direction T of the sheets 77, for example, the receiving belt 44 is followed by two ramp belts 48 arranged parallel to one another, for example in the form of respective revolving continuous belts.

Figure 15:
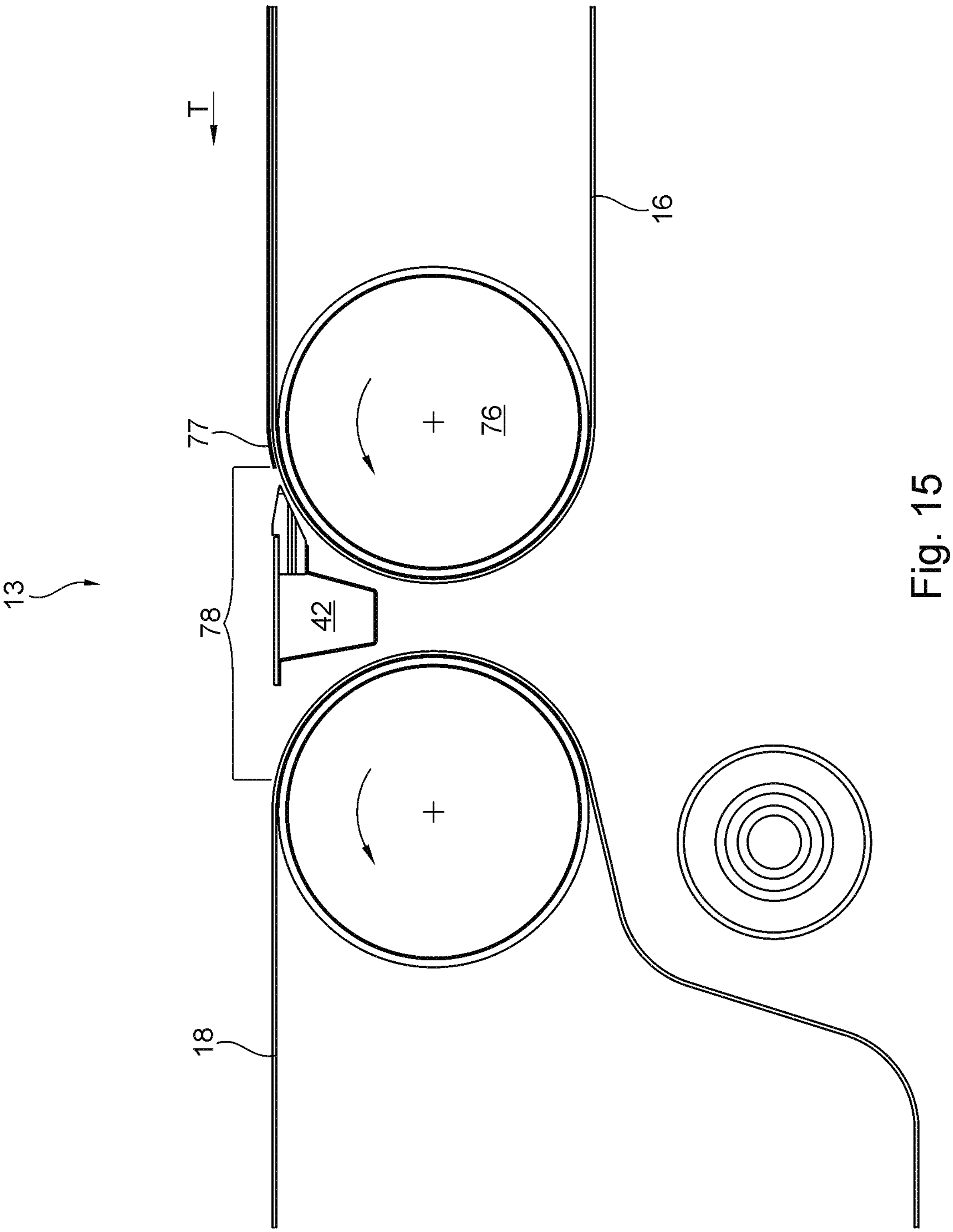
FIG. 15 a guide device between two conveyor belts consecutively arranged in the transport direction of the sheets.

FIG. 15 by way of example schematically shows a drastically simplified illustration of the guide device 42, which is arranged at a discontinuity point 78 in terms of the mechanical support of the sheets 77 to be transported and comprises at least one lifting nozzle 43, preferably several lifting nozzles 43, wherein this discontinuity point 78, for example, is arranged between a revolving conveyor belt 16 that forms part of a non-impact printing unit 13 and a revolving conveyor belt 18 that forms part of a dryer 17. A sheet 77 being transported in the transport direction T tends to be drawn with its leading edge, as a result of the rotation of the diverting roller 76, into a gap that is present at the discontinuity point 78 in the periphery of the diverting roller 76 and extends transversely to the transport direction T of the sheets 77, and thereby cause a disruption of the operation. Such a discontinuity point 78 in the mechanical support of the sheets 77 to be transported exists in several positions in a digital printing press that transports sheets 77 lying flat, as shown by way of example in FIG. 1, for example, at the respective transition to and after the non-impact printing unit 13 as well as at the transition from the dryer 17 to the suction belt feed table 19.

FIGS. 16 to 19 explain the operating principle of the guide device 42 arranged at such a discontinuity point 78 with reference to a digital printing press, transporting sheets 77 lying flat, at the transition of the sheets 77 from the non-impact printing unit 13 to a dryer 17 arranged directly downstream from the non-impact printing unit 13. These explanations apply, mutatis mutandis, also to all other positions at which a guide device 42 of the type in question is arranged, or at least can be arranged, in the relevant machine system, which is preferably configured as a digital printing press.

Figure 16:
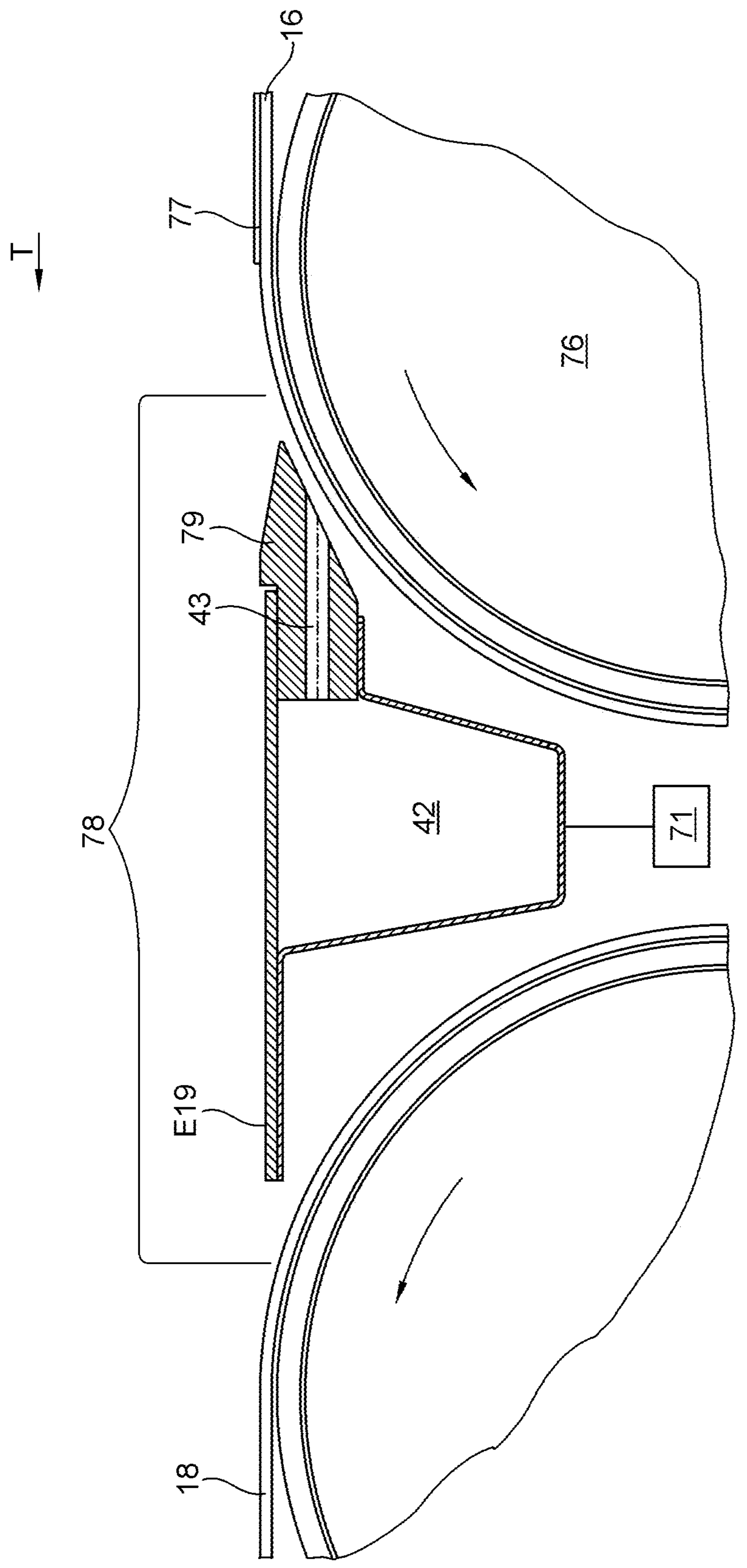
FIG. 16 a starting situation of the function of the guide device.
Figure 17:
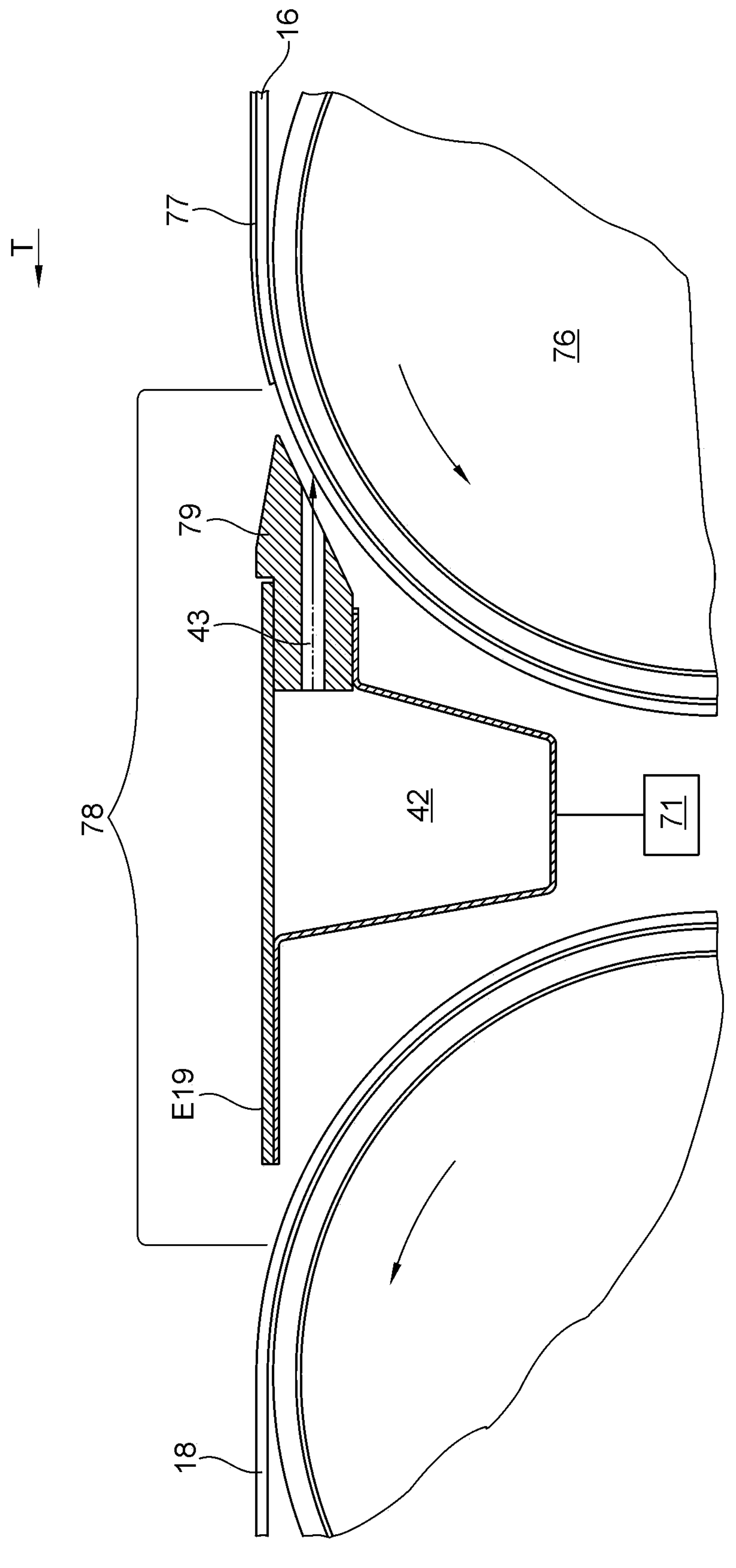
FIG. 17 the guide device at the start of its activation.

FIG. 16 shows the starting situation for the function of the guide device 42 arranged at the discontinuity point 78. A sheet 77 resting on the revolving conveyor belt 16 that forms part of the non-impact printing unit 13 reaches, with its leading edge, the discontinuity point 78 at the transition of the sheets 77, for example from the conveyor belt 16 of the non-impact printing unit 13 to a conveyor belt 18 of a dryer 17 which is arranged directly downstream from the non-impact printing unit 13. The guide device 42 comprises a tapered profile element 79, extending transversely to the transport direction T of the sheets 77, preferably in the form of a squeegee, wherein the tip of this profile element 79 is preferably arranged so as to be oriented counter to the transport direction T of the sheets 77 approximately tangentially to the conveyor belt 16 of the non-impact printing unit 13, wherein the tip of this profile element 79 is preferably spaced by a gap apart from the conveyor belt 16 of the non-impact printing unit 13 which is diverted at the rotating diverting roller 76, wherein this gap has a width that is larger in relation to the thickness of the sheets 77, in the range between, for example, 1 mm and 5 mm. At least one lifting nozzle 43 that opens in the direction of the tip of the profile element is arranged in the profile element 79, which lifting nozzle 43, upon an activation of the guide device 42, i.e., of at least one of its lifting nozzles 43, which is controlled by the control unit 71, for example, is used to orient, or at least can be used to orient, an air jet, indicated by a directional arrow in FIG. 17, against the conveyor belt 16 of the non-impact printing unit 13 which is diverted at the diverting roller 76. In the state of the activated guide device 42 shown in FIG. 17, the sheet 77 resting on the conveyor belt 16 of the non-impact printing unit 13 has increasingly approached the gap formed with respect to the guide device 42, compared to the starting situation shown in FIG. 16, as a result of the rotation of the diverting roller 76, wherein the leading edge of the relevant sheet 77 continues to follow the curvature of the diverting roller 76 in a manner that could potentially give rise to a disruption of the operation.

Figure 18:
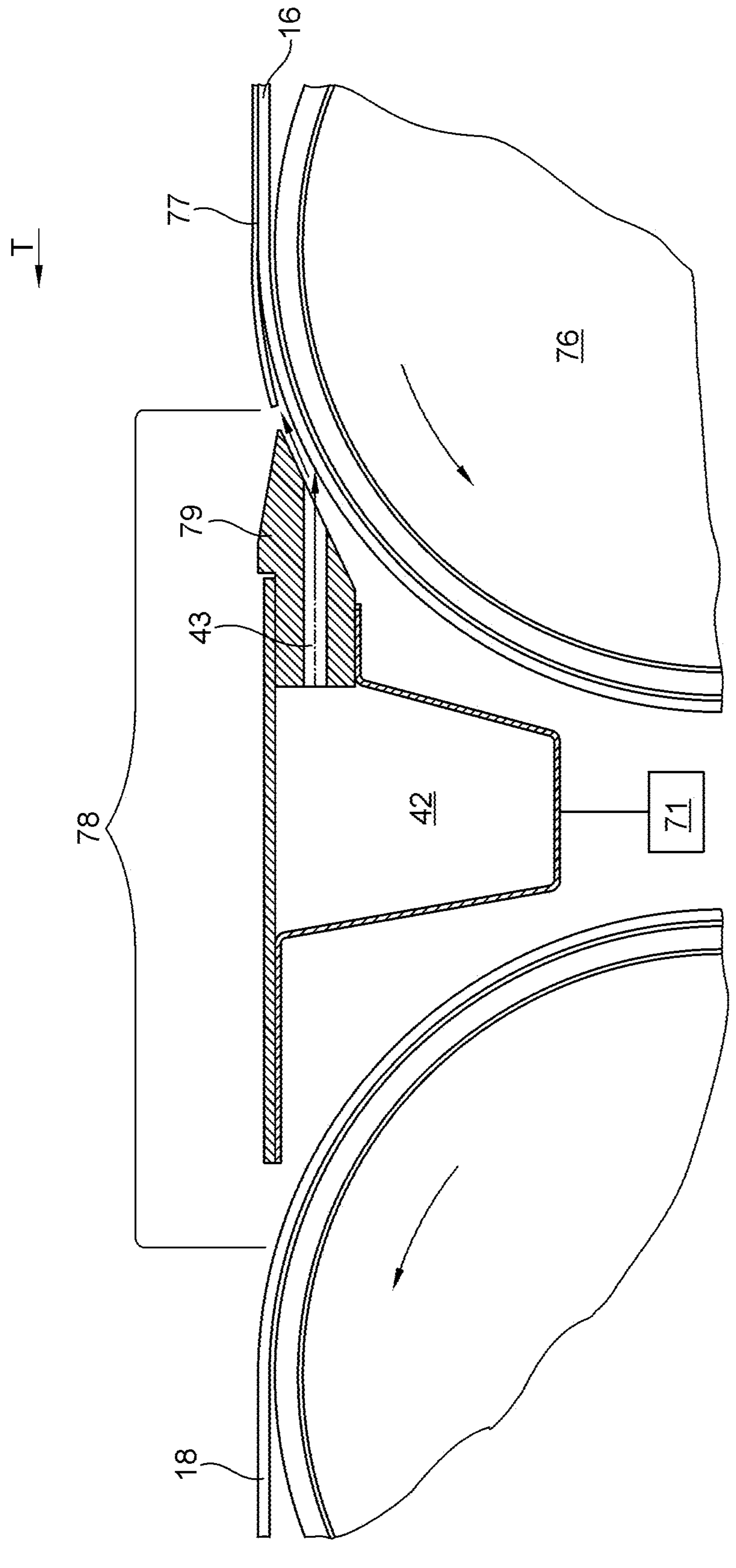
FIG. 18 the activated guide device
Figure 19:
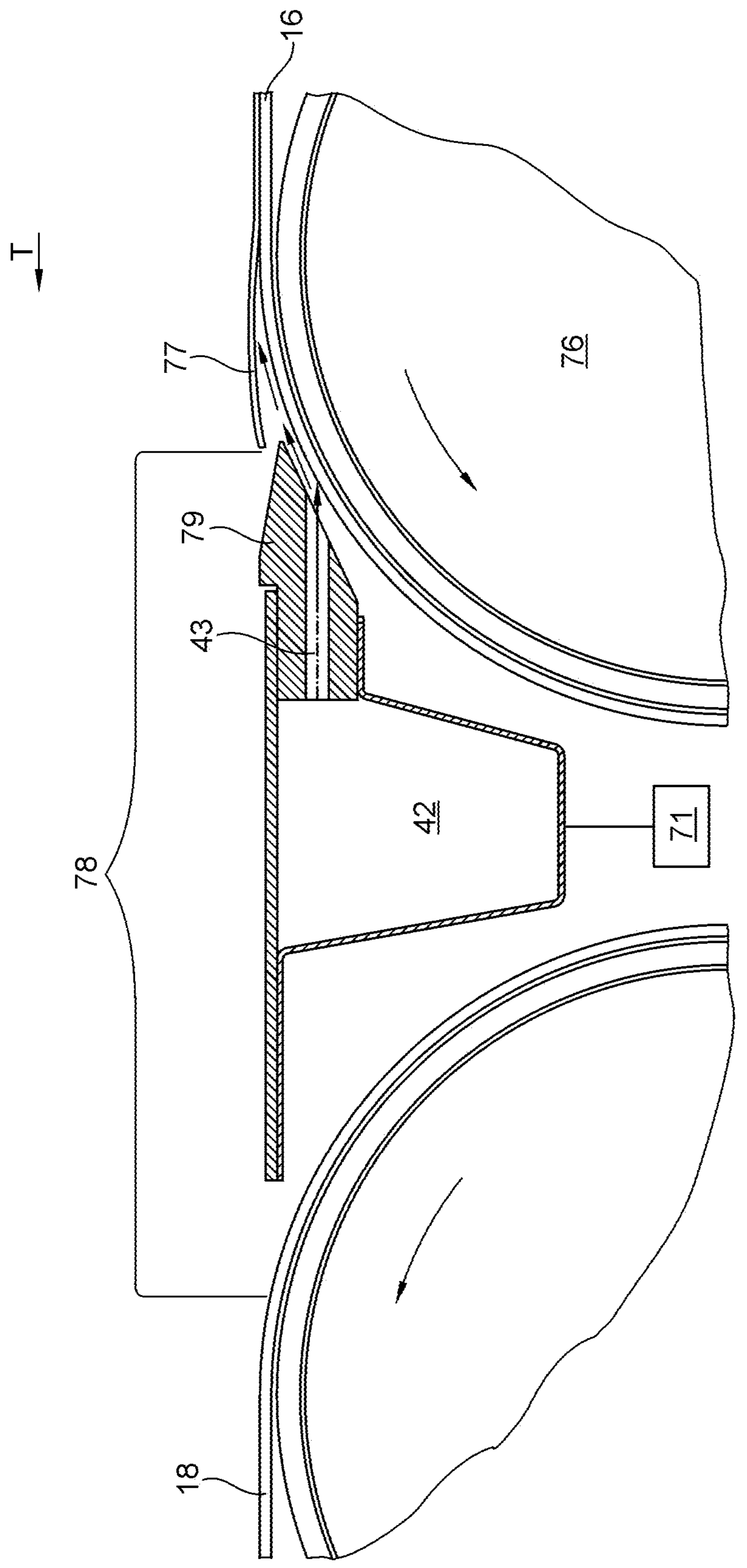
FIG. 19 the guide device when receiving a sheet.

As is apparent from FIGS. 18 and 19, upon activation of the guide device 42, the air jet that is blown out of the at least one lifting nozzle 43 arranged in the profile element 79 flows against the conveyor belt 16 of the non-impact printing unit 13 which is diverted at the diverting roller 76. This air jet impinges on the conveyor belt 16 in such a way that the direction of the core blast of this air jet intersects the circular circumferential line of the diverting roller 76 in the form of a secant. In addition, this air jet is oriented at the conveyor belt 16 in such a way that a free upper boundary of this air jet which faces the leading edge of the relevant sheet 77 neither intersects nor overlaps with a tangent between the circumferential line of the diverting roller 76 and the relevant lifting nozzle 43 of the guide device 42. The air jet that is oriented against the convex surface of the conveyor belt 16 of the non-impact printing unit 13 which is diverted at the diverting roller 76 is guided there by the curvature of the diverting roller 76 in the direction of the approaching leading edge of the relevant sheet 77. This air jet, which due to the Coanda effect follows the curvature of the diverting roller 76 and is converted into a wall flow, ultimately detaches the leading edge of the relevant sheet 77 from the conveyor belt 16 of the non-impact printing unit 13 (FIG. 18) and, upon further rotation of the diverting roller 76, due to the resultant dynamic pressure increasingly lifts the leading edge of the relevant sheet 77 off the conveyor belt 16 of the non-impact printing unit 13 (FIG. 19), so that the leading edge of the sheet 77, which still rests largely on the conveyor belt 16 of the non-impact printing unit 13, during its further transport is lifted onto the profile element 79, and thus onto the guide device 42. In the event that the transport device of the non-impact printing unit 13 mentioned here by way of example, which is arranged directly upstream from the discontinuity point 78 in the transport direction T of the sheets 77, comprises several, for example, at least two conveyor belts 16 that are arranged parallel to one another in the transport direction T of the sheets 77, it may be provided that at least one blower nozzle, which ejects compressed air in the direction of the sheet 77 resting on these conveyor belts 16, is arranged between adjacent conveyor belts 16. It may also be provided that the at least one conveyor belt 16 of the transport device arranged directly upstream from the discontinuity point 78 in the transport direction T of the sheets 77 comprises raised longitudinal ribs, wherein a respective groove is formed between adjacent belt ribs, and wherein the tip of the profile element 79 of the guide device 42 is arranged so as to protrude into the grooves of the conveyor belt 16 comprising belt ribs in a comb-like manner.

After the leading edge of the relevant sheet 77 rests securely on the profile element 79, the guide device 42 is preferably deactivated, for example by the control unit 71, in that the air jet flowing out of the at least one lifting nozzle 43 is switched off. The air jet flowing out of the at least one lifting nozzle 43 is thus preferably active in cycles, wherein this cycle is synchronized with the arrival of the leading edge of the respective sheet 77 at the diverting roller 76 of the conveyor belt 16 diverted by means of this diverting roller 76. An air jet flowing out of the at least one lifting nozzle 43 of the guide device 42 is therefore preferably only maintained until the leading edge of the respective sheet 77 has passed the gap at the discontinuity point 78, which is located in the periphery of the diverting roller 76 and extends transversely to the transport direction T of the sheets 77, and the leading edge of the respective sheet 77 has been lifted onto the profile element 79 of the guide device 42.

This yields a machine system comprising several processing stations, each processing sheets 77, wherein these processing stations are arranged one behind the other in the transport direction T of the sheets 77, wherein at least one of these processing stations comprises a first transport device transporting the sheets 77 along a linear transport section and comprising at least one continuously revolving conveyor belt 16 that is diverted at a rotating diverting roller 76, wherein this first transport device is configured so as to transport individual sheets 77 that directly follow one another in a sequence lying flat in each case on its at least one conveyor belt 16, wherein a second transport device transporting the sheets 77 lying flat along a linear transport section, likewise on at least one continuously revolving conveyor belt 18, or a suction belt feed table 19 is arranged downstream from this processing station comprising the first transport device, wherein a respective discontinuity point 78 in the mechanical support of these sheets 77 to be transferred in each case is formed at the point at which the sheets 77 to be transported are transferred from the conveyor belt 16 of the first transport device either to the conveyor belt 18 of the second transport device following in the transport direction T of the sheets 77, or to the suction belt feed table 19 in a conveying plane E19 of these sheets 77 to be transported, and wherein the diverting roller 76 diverting the at least one conveyor belt 16 of the first transport device is arranged at the discontinuity point 78 in the mechanical support of the sheets 77 to be transferred. A guide device 42, which extends transversely to the transport direction T of the sheets 77 and comprises a tapered profile element 79, is arranged at this discontinuity point 78, wherein the tip of this profile element 79 is oriented toward the conveyor belt 16 of the first transport device counter to the transport direction T of the sheets 77, wherein at least one lifting nozzle 43 is arranged in the profile element 79, and wherein the relevant lifting nozzle 43 is configured to open in the direction of the tip of this profile element 79. The tip of the profile element 79 is spaced by a gap apart from the conveyor belt 16 of the first transport device which is diverted at the rotating diverting roller 76, wherein this gap has a width that is larger in relation to the thickness of the sheets 77, in the range between 1 mm and 5 mm. In a preferred embodiment, several lifting nozzles 43 are arranged in the profile element 79 in a row extending transversely to the transport direction T of the sheets 77. Upon an activation of the guide device 42, for example controlled by a control unit 71, an air jet flowing out of the opening of the respective lifting nozzle 43 is oriented, or at least can be oriented, against the conveyor belt 16 of the first transport device which is diverted at the diverting roller 76, wherein this air jet is oriented at the conveyor belt 16 in such a way that a core blast of this air jet intersects the circumferential line of the diverting roller 76 in the form of a secant. The relevant air jet is moreover in particular also oriented in such a way that a free upper boundary of this air jet which faces a leading edge of a sheet 77 being transported on the conveyor belt 16 of the first transport device neither intersects nor overlaps with a tangent between the circumferential line of the diverting roller 76 and the relevant lifting nozzle 43 of the guide device 42. The guide device 42 is activated by the control unit 71. The control unit 71 activates the guide device 42, for example, in cycles, wherein this cycle is synchronized with the arrival of the leading edge of the respective sheet 77 at the diverting roller 76 of the conveyor belt 16 of the first transport device which is diverted by means of this diverting roller 76. The guide device 42 is thus preferably configured to maintain the air jet flowing out of the relevant lifting nozzle 43 only until the leading edge of the respective sheet 77 has passed the gap at the discontinuity point 78, which is located in the periphery of the diverting roller 76 and extends transversely to the transport direction T of the sheets 77, and the leading edge of the respective sheet 77 has been lifted onto the tip of the profile element 79 of the guide device 42 by the air jet flowing out of the relevant lifting nozzle 43. The diverting roller 76 diverting the at least one conveyor belt 16 of the first transport device and the guide device 42, including its profile element 79, are each arranged beneath the conveying plane E19 of the sheets 77 to be transported, and preferably so as to end flush with this conveying plane E19 toward the top. Since the machine system is configured as a digital printing press in its preferred embodiment, the processing station comprising the first transport device is either configured as a non-impact printing unit 13 or as a dryer 17 or as a cooling section.

When passing through a dryer 17 drying, for example, by hot air and/or by IR radiation, sheets lying flat individually on a conveyor belt 18, which were previously printed in a non-impact printing device 13, are subjected to very high heat input, as a result of which these dried sheets deform, i.e., in particular curl up, and thereby at least partially lose their flat position. Curling-up of the dried sheets can be so extensive that the relevant sheet loses its adhesion to the conveyor belt 18 of the dryer 17 and is at least no longer transported with positional accuracy. Ultimately, it is possible for curled-up sheets provided at the exit of the dryer 17 to no longer be reliably received by a receiving belt 44 of a transport device arranged directly downstream from the dryer 17 in the transport direction T of the sheets, which, for example, forms part of a suction belt feed table 19 or a cooling section, due to being inadequately grasped, which in a machine system comprising several transport devices in particular very quickly results in a disruption of the operation when such sheets follow one another at a transport speed of several thousand sheets per hour, for example of approximately 10,000 sheets per hour. The cause of the curled-up sheets being inadequately grasped is, in particular, that the bending resistance forces inherent in the curl of the relevant sheets are not overcome by a height-dependent suction force that is exerted by a suction belt. This problem of sheets that are curled-up in their edge region, in particular at their respective leading edge, being unreliably received by a suction belt can also occur in the conveying plane E19 of the suction belt feed table 19 at a kink 46; 47, at which a curvature of the previously, for example, horizontal conveying plane is present (FIGS. 2 and 3). To avoid that a print image that has previously been applied to the upper side of the relevant sheets in the non-impact printing device 13 becomes damaged, however, forcing the curled-up sheets from above into a flat position at the aforementioned locations in the machine system described here, for example by means of a mechanical hold-down device, is not an option.

So as to establish a necessary frictional engagement or force fit between a sheet, which in particular has curled up due to heat input, and a suction belt and transport this sheet by way of the suction belt with positional accuracy, it is proposed to take advantage of the physical phenomenon of the aerodynamic paradox, in particular with respect to the lateral edge regions of a turned-up leading edge of a sheet to be received from a suction belt and/or of a sheet to be transported by a suction belt.

Figure 20:
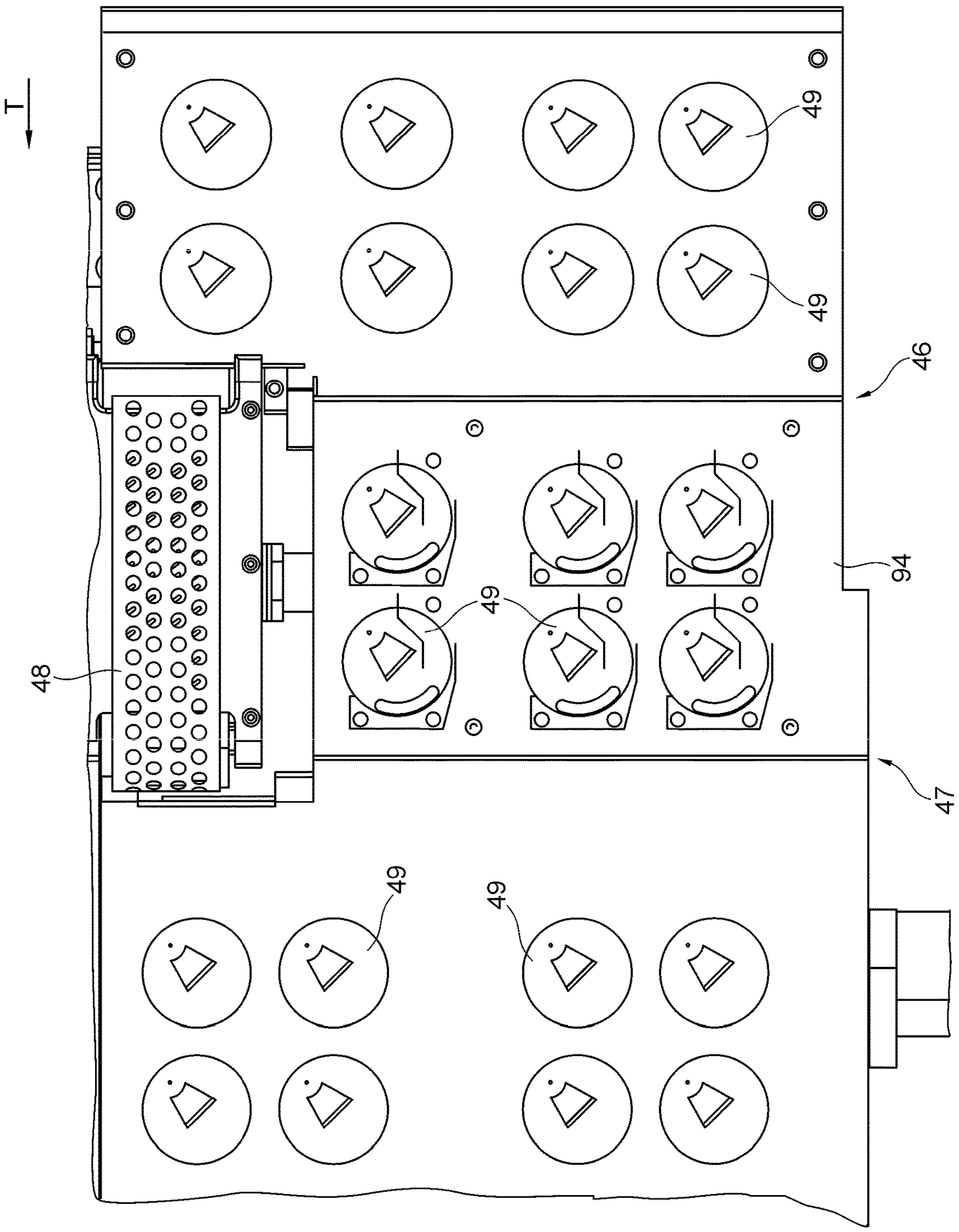
FIG. 20 a detail from the top view onto the suction belt feed table shown in FIG. 3, comprising a nozzle array.

The identified solution will be explained by way of example based on the above-described suction belt feed table 19. FIG. 20 shows an enlarged detail of the suction belt feed table 19 shown in a top view in FIG. 3, wherein this detail relates in particular to an arrangement of nozzles 49 in a region between one of the two ramp belts 48, which are arranged parallel to one another in the transport direction T of the sheets, and an edge 94, which extends longitudinally with respect to the transport direction T of the sheets and laterally delimits the conveying plane E19 of the suction belt feed table 19. Similarly to the at least one receiving belt 44 arranged upstream from the ramp belts in the transport direction T of the sheets, the ramp belts 48 are preferably configured in the form of respective revolving continuous belts, in particular in each case in the form of a suction belt, wherein the relevant suction belt has a pneumatic functional connection to a suction device 72 and, due to its at least sectional perforation, can exert a suction force on a sheet resting thereon. The transport direction T of the sheets is indicated by a directional arrow in the FIG. 20. A blowing direction of the nozzles 49 arranged in the aforementioned region, i.e., a flow direction of an air flow exiting these nozzles 49, is oriented, for example, in the transport direction T of the sheets. In a preferred embodiment shown in FIG. 20, the blowing direction of the nozzles 49 arranged in this region is either orthogonal to the edge 94 that laterally delimits the conveying plane E19 of the suction belt feed table 19 or is oriented inclined by 45°, in the transport direction T of the sheets, to the edge 94 that laterally delimits the conveying plane E19 of the suction belt feed table 19. Advantageously, it may also be provided that the blowing direction of a first subset of nozzles 49 is oriented, for example, orthogonal to the edge 94 that laterally delimits the conveying plane E19 of the suction belt feed table 19, and the blowing direction of a second subset of nozzles 49 is oriented inclined, for example, by 45°, in the transport direction T of the sheets, to the edge 94 that laterally delimits the conveying plane E19 of the suction belt feed table 19.

Figure 21:
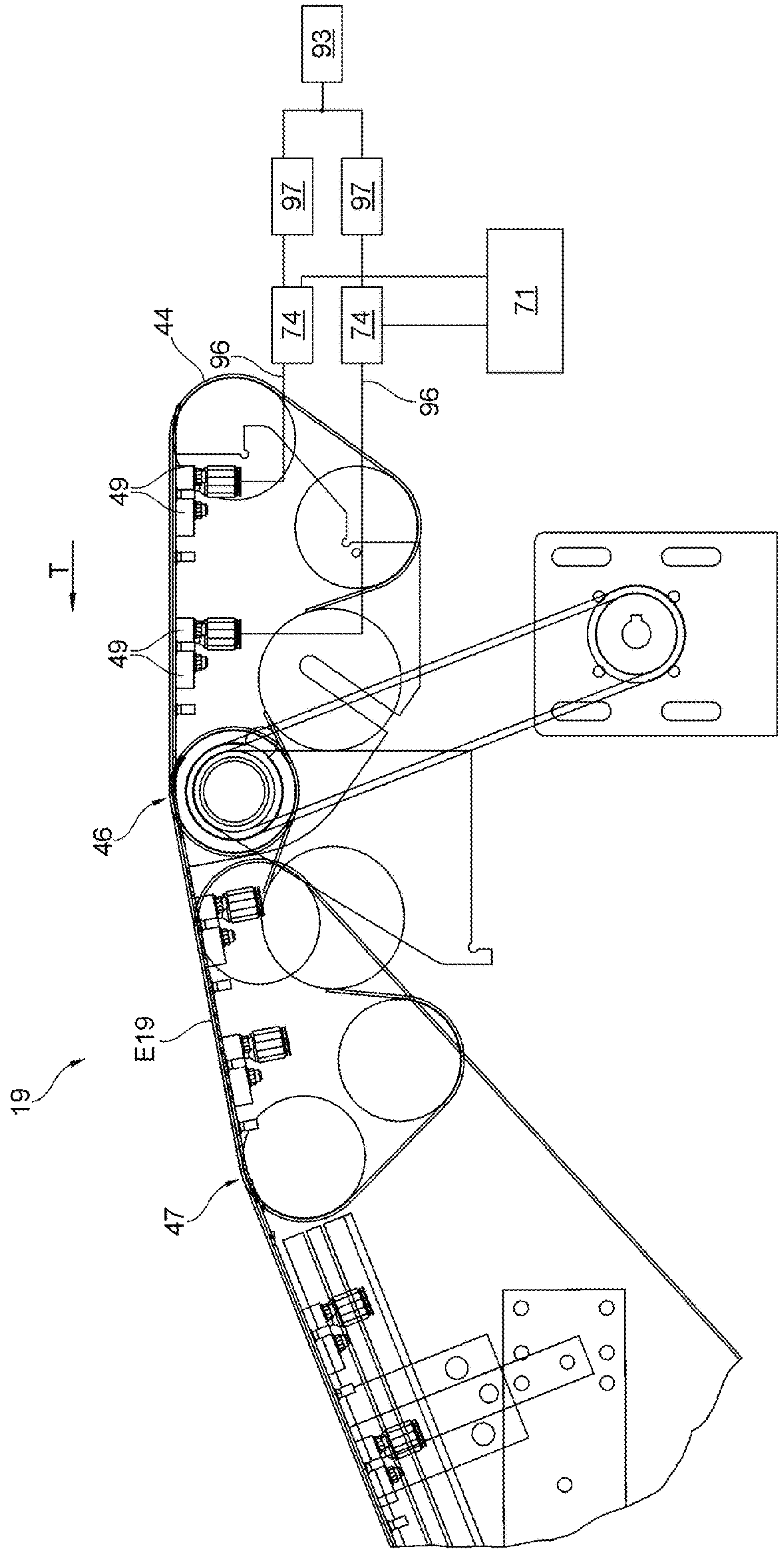
FIG. 21 a detail from the side view of the suction belt feed table shown in FIG. 2.

FIG. 21 shows a detail from the side view of the suction belt feed table 19 shown in FIG. 2. It is provided that sheets fed to the suction belt feed table 19, in particular from a dryer 17, are to be grasped by at least one receiving belt 44 and further transported in the conveying plane E19 of the suction belt feed table 19. Several nozzles 49 are arranged (FIGS. 3 and 20) in particular in the region of the at least one receiving belt 44 as well as in the region of the ramp belts 48 of the suction belt feed table 19, which are arranged downstream from the at least one receiving belt 44 in the transport direction T of the sheets, or in the transport direction T of the sheets directly following a discontinuity point 78 in the mechanical support of the sheets to be transported, for example between the at least one receiving belt 44 forming part of the suction belt feed table 19 and a revolving conveyor belt 18 forming part of a dryer 17. These nozzles 49 are in particular configured as Venturi nozzles and connected to a compressed air source 93 by means of a pneumatically connecting feed line 96. In a preferred embodiment, a control valve 97 for setting and/or for regulating a pressure of an air flow flowing out of the particular nozzle 49 is arranged in the feed line 96 connecting at least one of the nozzles 49 to the compressed air source 93. In a particularly advantageous embodiment, a cycle valve 74, which is controlled by the control unit 71, for example, is arranged in the feed line 96 connecting at least one of the nozzles 49 to the compressed air source 93, between the relevant control valve 97 and the relevant nozzle 49. Such a cycle valve 74 is preferably controlled by the control unit 71 in such a way that compressed air is supplied to at least one of the nozzles 49 at exactly the moment at which the leading edge of a sheet to be transported overlaps with the relevant nozzle 49. The supply of compressed air to the relevant nozzle 49 is then interrupted by the control unit 71 in particular when the leading edge of the relevant sheet to be transported has been brought into an overlapping position with a subsequent nozzle 49 in the transport direction T of the sheets. Moreover, it is provided that the supply of compressed air to the nozzles 49, arranged in the outline of a sheet to be caught, is interrupted by means of the relevant cycle valve 74 when the catching device 58 of the suction belt feed table 19 has been switched into its catching position.

This yields a suction belt feed table 19 comprising at least one continuously revolving receiving belt 44, configured as a suction belt, for receiving sheets that are individually transported lying flat in a conveying plane E19 from a conveyor belt 18 of a dryer 17 which is arranged directly upstream from the suction belt feed table 19 in the transport direction T of the sheets, wherein the suction belt feed table 19, in its conveying plane E19, comprises an arrangement of several nozzles 49, at least in a region between the at least one receiving belt 44 extending longitudinally with respect to the transport direction T of the sheets and an edge 94 that laterally delimits the conveying plane E19 of the suction belt feed table 19, wherein each of these nozzles 49 is configured as a Venturi nozzle, wherein a flow direction of at least a first subset of the nozzles 49 arranged in the aforementioned region is oriented in the transport direction T of the sheets and/or wherein a flow direction of at least a second subset of the nozzles 49 arranged in the aforementioned region is oriented orthogonal to the edge 94 that laterally delimits the conveying plane E19 of the suction belt feed table 19 and/or wherein a flow direction of at least a third subset of the nozzles 49 arranged in the aforementioned region is oriented inclined by 45°, with respect to the transport direction T of the sheets, to the edge 94 that laterally delimits the conveying plane E19 of the suction belt feed table 19. Moreover, at least one kink 46; 47 can be formed downstream from the at least one receiving belt 44 in the conveying plane E19 of the suction belt feed table 19, wherein the conveying plane E19 of the suction belt feed table 19, at each of these kinks 46; 47, in each case experiences a downwardly oriented inclination at an acute angle in the range between 5° and 30° compared to the prior orientation of the conveying plane, wherein the arrangement of the nozzles 49 formed in the region between the at least one receiving belt 44 and the relevant edge 94 that laterally delimits the conveying plane E19 of the suction belt feed table 19 extends beyond the relevant kink 46; 47 in the transport direction T of the sheets. In the aforementioned region or in the regions following one another in the transport direction T of the sheets, the nozzles 49 are in each case, for example, arranged in several rows that each extend transversely to the transport direction T of the sheets (FIGS. 3 and 20).

The nozzles 49 are in each case connected to a compressed air source 93 by means of a pneumatically connecting feed line 96, wherein a control valve 97 for setting and/or for regulating the pressure of an air flow flowing out of the particular nozzle 49 is arranged in at least one of the feed lines 96 connecting at least one of the nozzles 49 to the compressed air source 93. In a preferred embodiment, a cycle valve 74 is arranged in the relevant feed line 96 connecting at least one of the nozzles 49 to the compressed air source 93, between the relevant control valve 97 and the relevant nozzle 49. The relevant control valve 97 and/or the relevant cycle valve 74 are controlled by a control unit 71. The relevant cycle valve 74 is in particular activated by the control unit 71 when an overlap of the leading edge of a sheet to be transported with the relevant nozzle 49 exists. The relevant cycle valve 74 is in particular deactivated by the control unit 71 when the leading edge of the relevant sheet to be transported has been brought into an overlapping position with a subsequent nozzle 49 in the transport direction T of the sheets. In a particularly preferred embodiment, the suction belt feed table 19 comprises a catching device 58 having the above-described features for sheets to be caught, wherein the relevant cycle valve 74 is deactivated by the control unit 71 when the catching device 58 has been switched into its catching position.

Since each of the nozzles 49 is configured as a Venturi nozzle, they generate a suction pick-up force acting on a sheet to be transported, which in absolute terms is several times greater than a retaining force that is generated by the suction flow at a suction belt arranged in the conveying plane E19 of the suction belt feed table 19 and provided for retaining a sheet resting flat on the relevant suction belt. Moreover, a width of the region including the arrangement of nozzles 49 which extends transversely to the transport direction T of the sheets is designed to be considerably larger than the width of the relevant suction belt which extends transversely to the transport direction T of the sheets, so that the width of the region including the arrangement of nozzles 49 which is located outside the width of the relevant suction belt has a considerably more favorable ratio to the width of the turned-up leading edge of the relevant sheet. Accordingly, an effective surface that is formed by the arrangement of the nozzles 49 and acts on the turned-up leading edge of the relevant sheet is considerably larger than the effective surface acting by the relevant suction belt on the turned-up leading edge of the relevant sheet. However, the larger the particular effective surface, the easier it is to overcome the bending resistance forces inherent in the curl of the relevant sheets. Since the action of the suction flow of the relevant suction belt is height-dependent and increasingly decreases with increasing height, i.e., the distance between the relevant suction belt and the sheet to be transported, the nozzles 49 configured as Venturi nozzles can cause the turned-up leading edge of the relevant sheet to be preliminarily picked up until the relevant leading edge reaches the exposure zone of the suction flow of the relevant suction belt. After the turned-up leading edge of the relevant sheet is located sufficiently far in the exposure zone of the suction flow of the relevant suction belt as a result of the action of the nozzles 49, this suction flow, in some circumstances, may be strong enough to suck the turned-up leading edge of the relevant sheet against the relevant suction belt, over the remaining residual height, and establish the frictional engagement or force fit required for transporting the relevant sheet in an accurately positioned manner. In a preferred embodiment, the control unit 71 is thus configured so as to first supply compressed air to the nozzles 49, and that only thereafter, i.e., with time delay, a suction force that is exerted on the sheet by at least one receiving belt 44 configured as a suction belt begins to act.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A printing press comprising a non-impact printing device (13), the printing press further comprising a plurality of processing stations for processing sheets (77); the plurality of processing stations arranged along a transport direction (T) of the sheets (77); a first processing station of the plurality of processing stations comprising the non-impact printing device (13); the first processing station or a second processing station of the plurality of processing stations comprising a first transport device that transports the sheets (77) along a first linear transport section, the first transport device comprising at least one first conveyor belt (16) that continuously revolves and that is diverted at a rotating diverting roller (76); the first transport device being configured to transport adjacent individual sheets (77) that directly follow one another in a sequence lying flat on the at least one first conveyor belt (16); a second transport device transporting the sheets (77) lying flat along a second linear transport section, on at least one second conveyor belt (18) that continuously revolves and that is arranged downstream in the transport direction (T) from the first or second processing station comprising the first transport device; a discontinuity point (78) in mechanical support of the sheets (77) to be transferred being formed at a location at which the sheets (77) to be transported are transferred from the at least one first conveyor belt (16) of the first transport device to the relevant at least one second conveyor belt (18) of the second transport device following in the transport direction (T) of the sheets (77), in a conveying plane (E19) of the sheets (77) to be transported; the diverting roller (76) diverting the at least one first conveyor belt (16) of the first transport device being arranged at the discontinuity point (78) in the mechanical support of the sheets (77) to be transferred; a guide device (42), which extends transversely to the transport direction (T) of the sheets (77) and comprises a tapered profile element (79), being arranged at the discontinuity point (78); the guide device (42) being arranged at the discontinuity point (78) between the at least one first conveyor belt (16) and the at least one second conveyor belt (18) arranged consecutively in the transport direction (T) of the sheets (77); a tip of the profile element (79) being oriented toward the at least one first conveyor belt (16) of the first transport device counter to the transport direction (T) of the sheets (77); the tip of the profile element (79) being spaced apart from the at least one first conveyor belt (16) by a gap between the tip and the at least one first conveyor belt (16); the gap between the tip of the profile element (79) and the at least one first conveyor belt (16) having a width in a range between 1 mm and 5 mm; a control unit (71) and at least one lifting nozzle (43) being provided; and a third processing station of the plurality of processing stations, that is arranged directly downstream from the first or second processing station, being configured as a suction belt feed table (19), characterized in that the at least one lifting nozzle (43) is arranged in the profile element (79) of the guide device (42), the at least one lifting nozzle (43) being configured to open in a direction of the tip of the profile element (79), the suction belt feed table (19) comprising a catching device (58) having a catching position, which is assumed as a result of an actuation, for adjacent individual sheets (77) that follow one another, and the catching device (58), in the catching position, catching the sheets (77) on the suction belt feed table (19) that are fed from the first transport device (18), which is arranged upstream from the suction belt feed table (19), to the suction belt feed table (19) before being transferred to a transport device arranged downstream from the suction belt feed table (19), and stacked.

2. The printing press according to claim 1, characterized in that the diverting roller (76) diverting the at least one first conveyor belt (16) of the first transport device and the guide device (42) are each arranged beneath the conveying plane (E19) of the sheets (77) to be transported and arranged to end up flush with the conveying plane (E19) on an upper side.

3. The printing press according to claim 1, characterized in that the at least one lifting nozzle (43) is activated, or at least can be activated, by the control unit (71).

4. The printing press according to claim 3, characterized in that, upon an activation of the guide device (42), an air jet flowing out of an opening of the at least one lifting nozzle (43) is oriented against the at least one first conveyor belt (16) of the first transport device.

5. The printing press according to claim 4, characterized in that the air jet that is oriented against the at least one first conveyor belt (16) of the first transport device is oriented at the at least one first conveyor belt (16) in such a way that the air jet flowing from the lifting nozzle (43) intersects a circumferential line of the diverting roller (76) secantially.

6. The printing press according to claim 4, characterized in that the air jet flowing out of the opening of the at least one lifting nozzle (43) is oriented in such a way at the at least one first conveyor belt (16) that a free upper boundary of the air jet which faces a leading edge of a respective sheet (77) being transported on the at least one first conveyor belt (16) neither intersects nor overlaps with a tangent between a circumferential line of the diverting roller (76) and the lifting nozzle (43) of the guide device (42).

7. The printing press according to claim 6, characterized in that the at least one lifting nozzle (43) of the guide device (42) is controlled by the control unit (71) in such a way that the guide device (42) only maintains the air jet flowing out of the relevant lifting nozzle (43) until the leading edge of the respective sheet (77) has passed the gap at the discontinuity point (78), which is located in the at a periphery of the diverting roller (76) and extends transversely to the transport direction (T) of the sheets (77), and the leading edge of the respective sheet (77) has been lifted onto the tip of the profile element (79) of the guide device (42) by the air jet flowing out of the at least one lifting nozzle (43).

8. The printing press according to claim 3, characterized in that the guide device (42) is activated in cycles by the control unit (71), wherein a respective cycle of the cycles is synchronized with an arrival of a leading edge of a respective sheet (77) at the diverting roller (76) of the first conveyor belt (16).

9. The printing press according to claim 1, characterized in that the at least one lifting nozzle (43) comprises a plurality of lifting nozzles (43) that are arranged in the profile element (79) in a row extending transversely to the transport direction (T) of the sheets (77).

10. The printing press according to claim 1, characterized in that the control unit (71) controlling the guide device (42) actuates the catching device (58) as a function of a disruption that has occurred in one of the processing stations, of the plurality of processing stations, that is arranged downstream from the suction belt feed table (19) in such a way that the catching device (58) assumes-its the catching position.

11. The printing press according to claim 1, characterized in that the control unit (71) controlling the guide device (42) is configured to decrease a transport speed of the sheets (77) at least in a transport device arranged upstream from the catching device (58), in the transport direction (T) of the sheets (77), in an event that a disruption has occurred in one of the processing stations, of the plurality of processing stations, that is arranged downstream from the suction belt feed table (19).

12. The printing press according to claim 1, characterized in that the suction belt feed table (19) comprises at least one receiving belt (44) that continuously revolves, which is configured as a suction belt, for receiving the sheets (77) transported individually, lying flat, in the conveying plane (E19) from the at least one second conveyor belt (18), which is arranged upstream from the suction belt feed table (19) in the transport direction (T) of the sheets (77), the suction belt feed table (19), in the conveying plane (E19), comprising an arrangement of a plurality of nozzles (49), at least in a region between the at least one receiving belt (44) extending longitudinally with respect to the transport direction (T) of the sheets (77) and an edge (94) that laterally delimits the conveying plane (E19) of the suction belt feed table (19), and the nozzles (49) arranged in the region between the at least one receiving belt (44) extending longitudinally with respect to the transport direction (T) of the sheets (77) and an edge (94) that laterally delimits the conveying plane (E19) of the suction belt feed table (19) are configured as Venturi nozzles.

13. The printing press according to claim 12, characterized in that an arrangement of the Venturi nozzles starts, in the transport direction (T) of the sheets (77), at a distance of less than 200 mm downstream from the at least one lifting nozzle (43).

14. The printing press according to claim 12, characterized in that the diverting roller (76) arranged at the discontinuity point (78) has, on an outer cylindrical surface thereof, at least one nozzle-shaped opening, a compressed air jet exiting from each at least one nozzle-shaped opening, with at least one of the compressed air jets being oriented at least in a direction of the at least one lifting nozzle (43).

15. The printing press according to claim 1, characterized in that the at least one first conveyor belt (16) of the first transport device comprises a plurality of the conveyor belts (16) arranged adjacent to one another in the transport direction (T) of the sheets (77), at least one blower nozzle, which ejects compressed air in the direction of a sheet (77) resting on the conveyor belts (16), being arranged between the adjacent conveyor belts (16).

16. The printing press according to claim 1, characterized in that the at least one conveyor belt (16) of the transport device arranged directly upstream from the discontinuity point (78), in the transport direction (T) of the sheets (77), comprises raised longitudinal ribs, a respective groove being formed between adjacent longitudinal ribs, and the tip of the profile element (79) of the guide device (42) being arranged so as to protrude in a comb-like manner into the respective grooves of the conveyor belt (16) comprising longitudinal ribs.

* * * * *